(12) United States Patent
Takashima

(10) Patent No.: US 11,422,026 B2
(45) Date of Patent: Aug. 23, 2022

(54) INFORMATION PROCESSING DEVICE, INFORMATION PROCESSING METHOD, AND PROGRAM TO PERFORM CALIBRATION WITH RESPECT TO ENVIRONMENT LIGHT

(71) Applicant: Sony Group Corporation, Tokyo (JP)

(72) Inventor: Masatoshi Takashima, Tokyo (JP)

(73) Assignee: Sony Group Corporation, Kanagawa (JP)

( * ) Notice: Subject to any disclaimer, the term of this patent is extended or adjusted under 35 U.S.C. 154(b) by 0 days.

(21) Appl. No.: 17/264,137

(22) PCT Filed: Jul. 23, 2019

(86) PCT No.: PCT/JP2019/028752
§ 371 (c)(1),
(2) Date: Jan. 28, 2021

(87) PCT Pub. No.: WO2020/031681
PCT Pub. Date: Feb. 13, 2020

(65) Prior Publication Data
US 2021/0310860 A1    Oct. 7, 2021

(30) Foreign Application Priority Data
Aug. 6, 2018    (JP) .............................. JP2018-147568

(51) Int. Cl.
*G01J 1/42*    (2006.01)
*G01J 1/04*    (2006.01)
(Continued)

(52) U.S. Cl.
CPC ........... *G01J 1/4204* (2013.01); *G01J 1/0219* (2013.01); *G01J 1/0422* (2013.01); *G01J 1/0474* (2013.01);
(Continued)

(58) Field of Classification Search
CPC ...... G01J 1/4204; G01J 1/0422; G01J 1/0474; G01J 1/0488; G01J 1/0219; G01J 1/0492;
(Continued)

(56) References Cited

U.S. PATENT DOCUMENTS

2008/0266554 A1 * 10/2008 Sekine .................. G01J 1/4204
356/300
2016/0232828 A1    8/2016 Jia et al.
2018/0180533 A1    6/2018 Murakami et al.

FOREIGN PATENT DOCUMENTS

JP             4088016 B2 *  5/2008
JP          2017216524 A    12/2017
WO    WO-2017010258 A1 *  1/2017 ............. G01N 21/27

OTHER PUBLICATIONS

International Search Report (PCT/ISA/210), International Application No. PCT/JP2019/028752, dated Oct. 28, 2019.
(Continued)

*Primary Examiner* — Jennifer D Bennett
(74) *Attorney, Agent, or Firm* — Michael Best & Friedrich LLP

(57) ABSTRACT

To easily and accurately perform calibration with respect to environment light. In one example, an information processing device includes a memory configured to store detected values of illuminances of environment light; and a color temperature estimation unit configured to estimate a color temperature of the environment light, on a basis of detected values of illuminances of the environment light within a plurality of wavelength bands. The disclosed technology can, for example, be applied to a system that performs remote sensing on an agricultural land, and calculates an evaluation index such as a normalized difference vegetation index (NDVI).

17 Claims, 24 Drawing Sheets

(51) Int. Cl.
    *G01N 21/31*     (2006.01)
    *G01N 21/27*     (2006.01)
    *G01J 1/02*     (2006.01)
    *G01N 21/84*     (2006.01)

(52) U.S. Cl.
    CPC ........... *G01J 1/0488* (2013.01); *G01J 1/0492* (2013.01); *G01N 21/274* (2013.01); *G01N 21/31* (2013.01); *G01N 2021/8466* (2013.01)

(58) Field of Classification Search
    CPC ......... G01N 2021/8466; G01N 21/274; G01N 21/31
    See application file for complete search history.

(56) References Cited

OTHER PUBLICATIONS

International Written Opinion (PCT/ISA/237), International Application No. PCT/JP2019/028752, dated Oct. 28, 2019.

\* cited by examiner

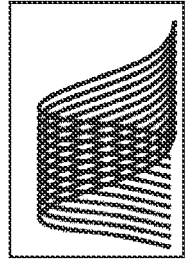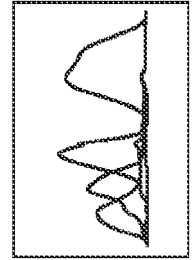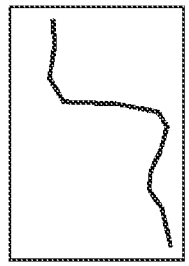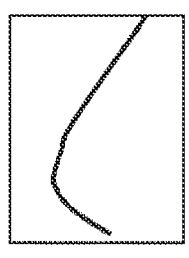
FIG. 7A
FIG. 7B

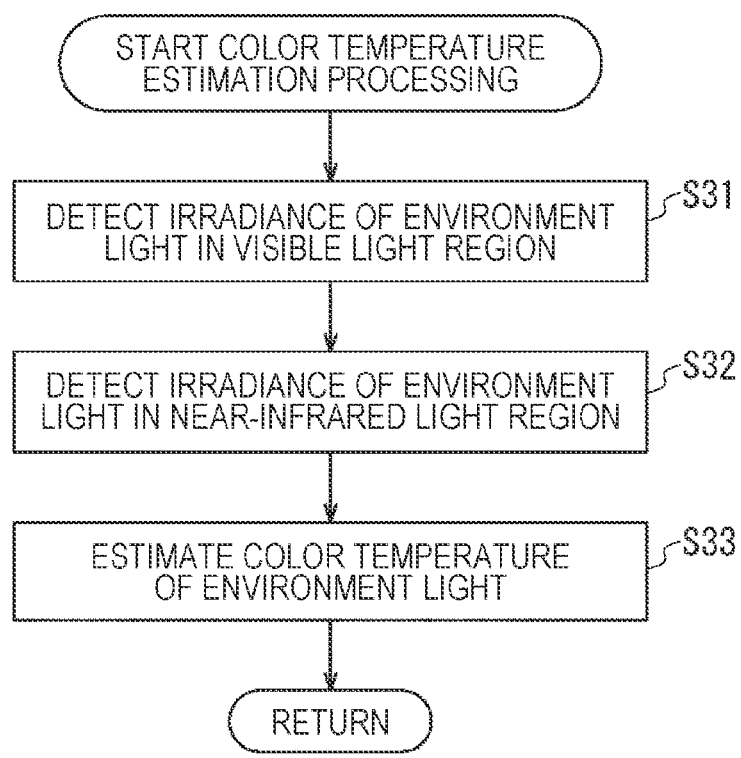

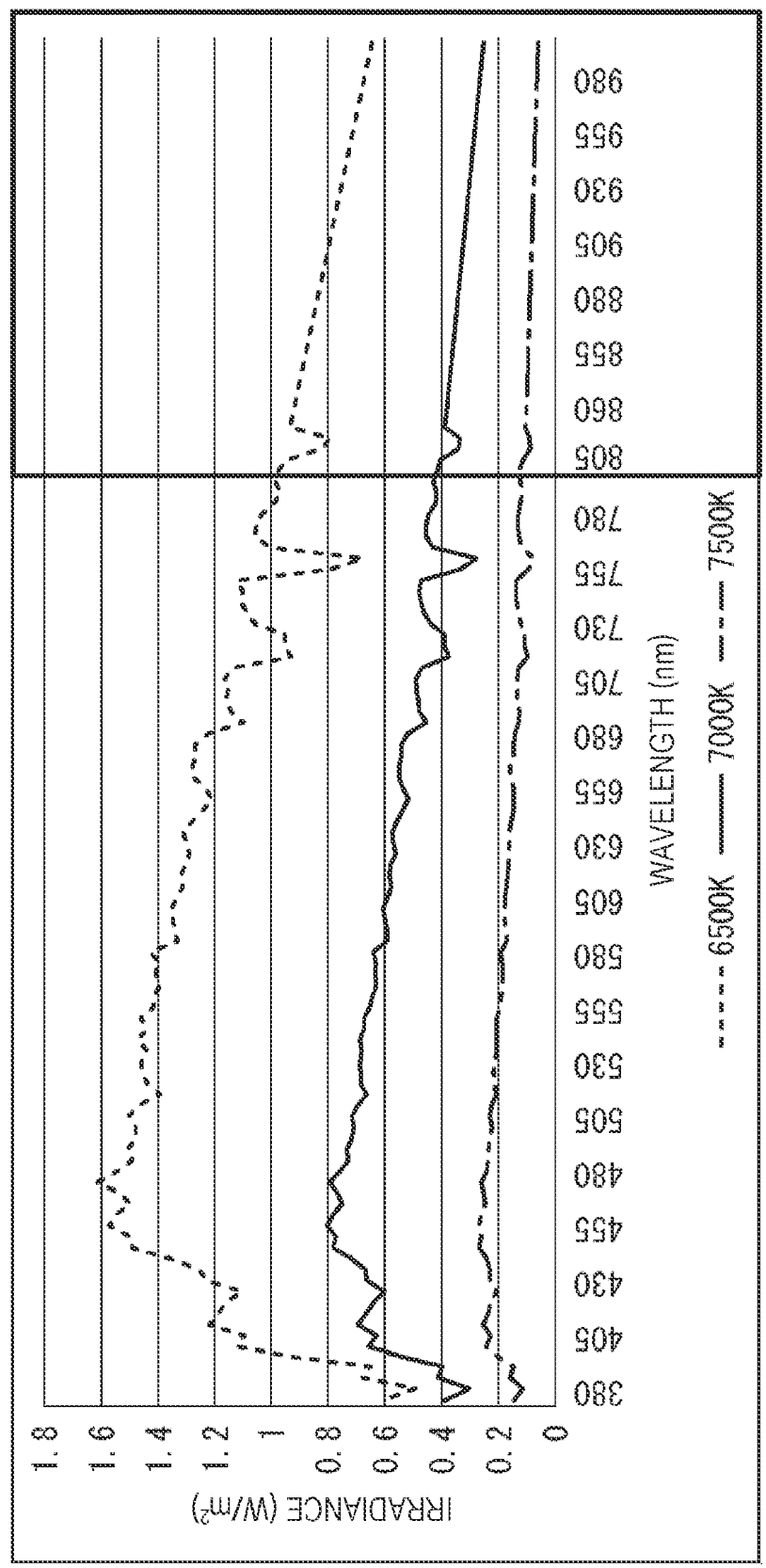

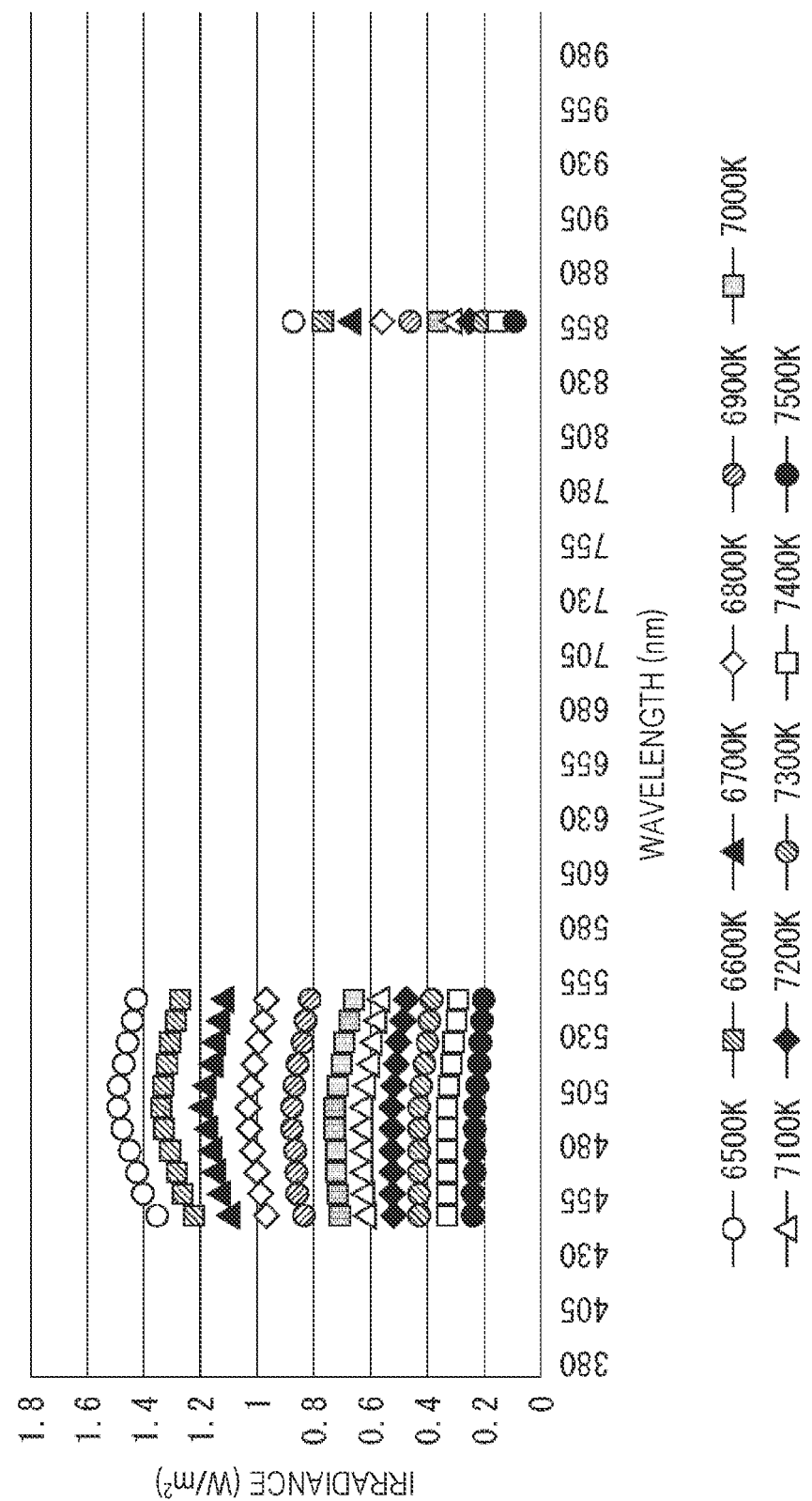

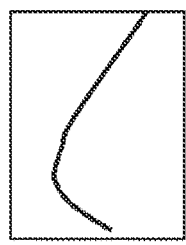 × 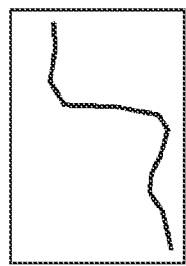 × 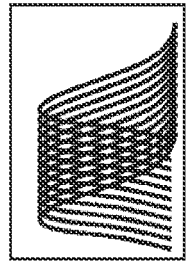 = $C0(\lambda)$
FIG. 14A
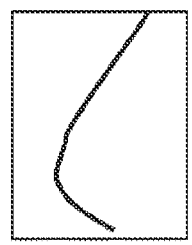 × 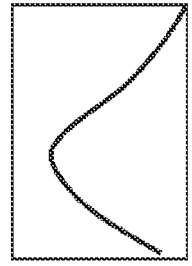 = $S0(\lambda)$
FIG. 14B

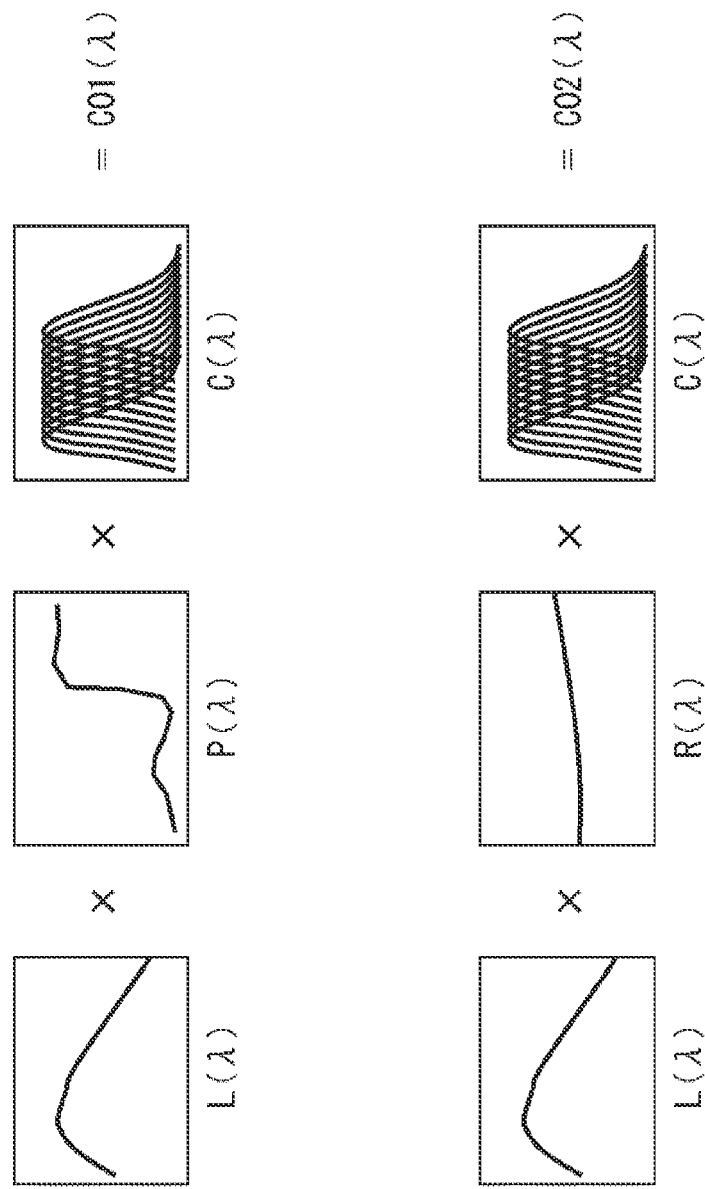

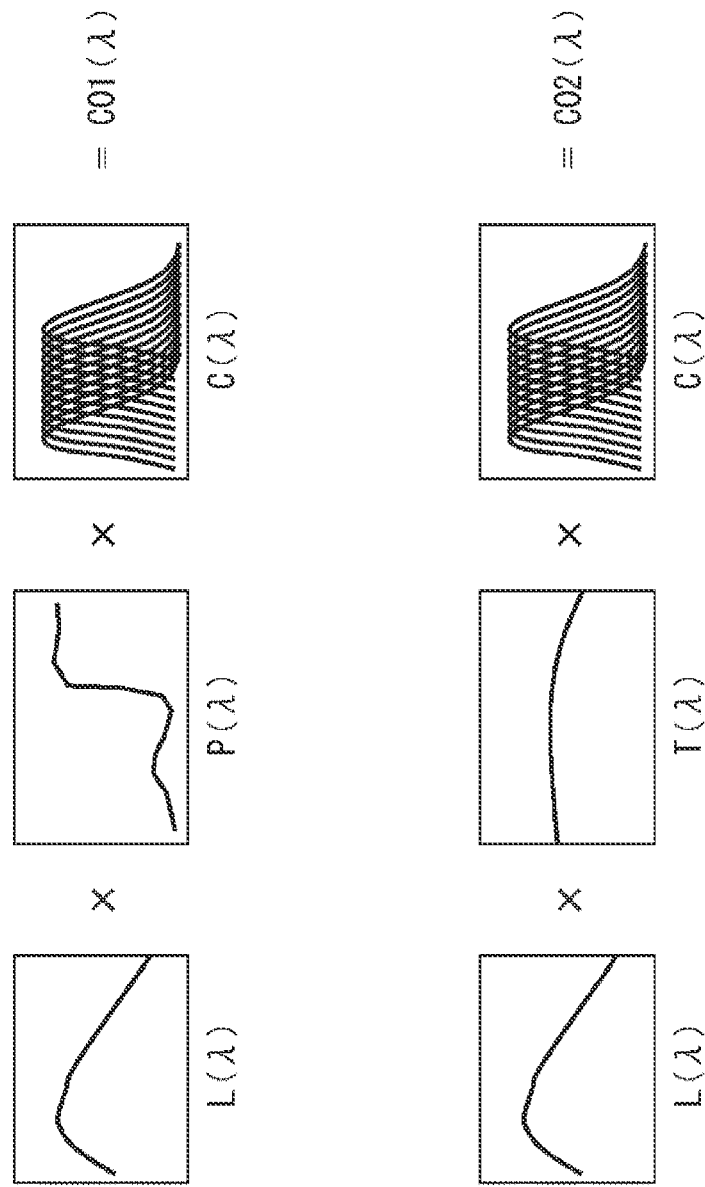

INFORMATION PROCESSING DEVICE, INFORMATION PROCESSING METHOD, AND PROGRAM TO PERFORM CALIBRATION WITH RESPECT TO ENVIRONMENT LIGHT

CROSS REFERENCE TO RELATED APPLICATIONS

This application claims the benefit of Japanese Priority Patent Application JP 2018-147568 filed on Aug. 6, 2018, the entire contents of which are incorporated herein by reference.

TECHNICAL FIELD

The present technology relates to an information processing device, an information processing method, and a program, and in particular, relates to an information processing device, an information processing method, and a program, preferably used in the case of performing calibration with respect to environment light.

BACKGROUND ART

In the related art, it is proposed that calibration with respect to environment light be performed by using a standard reflection plate at the time of measuring an inspection index of an inspection target such as a plant.

For example, a spectrum of reflection light reflected on the standard reflection plate provided in a position where the standard reflection plate can be sensed simultaneously with the inspection target, is detected by a spectroscope, and a measured spectrum of the inspection target is corrected on the basis of the detected spectrum of the reflection light. With this arrangement, the influence of the environment light on the measured spectrum of the inspection target, is reduced (for example, refer to PTL 1).

CITATION LIST

Patent Literature

[PTL 1]
WO 2017/10258A

SUMMARY

Technical Problem

However, for example, in a case where a camera is mounted on a drone, and a farmstead or the like is photographed from the above, it is difficult to simultaneously photograph the standard reflection plate with the inspection target at all times, and thus, it is difficult to perform the calibration with respect to the environment light.

The present technology has been made in consideration of such circumstances, and it is desirable that calibration with respect to environment light can be easily and accurately performed.

Solution to Problem

According to one aspect of the present technology, there is provided an information processing device, including: a color temperature estimation unit configured to estimate a color temperature of environment light, on the basis of detected values of illuminances of the environment light at a plurality of wavelength bands, detected by an illuminance sensor.

According to one aspect of the present technology, there is provided an information processing method including: allowing an information processing device to estimate a color temperature of environment light, on the basis of detected values of illuminances of the environment light at a plurality of wavelength bands, detected by an illuminance sensor.

According to one aspect of the present technology, there is provided a program for allowing a computer to execute processing of: estimating a color temperature of environment light, on the basis of detected values of illuminances of the environment light at a plurality of wavelength bands, detected by an illuminance sensor.

According to one aspect of the present technology, the color temperature of the environment light is estimated on the basis of the detected values of the illuminances of the environment light at the plurality of wavelength bands, detected by the illuminance sensor.

Advantageous Effects of Invention

According to one aspect of the present technology, it is possible to easily and accurately estimate the color temperature of the environment light. As a result, for example, it is possible to easily and accurately perform the calibration with respect to the environment light.

Furthermore, the effects described here are not necessarily limited, but may be any effect described in the present disclosure.

BRIEF DESCRIPTION OF DRAWINGS

FIGS. 7A and 7B are diagrams illustrating a sensing image and a calculation equation of spectral characteristics of illuminance data.

FIG. 8 is a flowchart for describing the details of color temperature estimation processing of FIG. 6.

FIG. 10 is a graph illustrating spectral characteristics of environment light of each color temperature.

FIG. 11 is a diagram in which a first embodiment of an input table is illustrated as a graph.

FIGS. 14A and 14B are diagrams illustrating another first method of spectroscopic analysis of the environment light.

FIGS. 15A and 15B are diagrams illustrating another second method of the spectroscopic analysis of the environment light.

FIGS. 16A and 16B are diagrams illustrating another third method of the spectroscopic analysis of the environment light.

DESCRIPTION OF EMBODIMENTS

Hereinafter, modes for carrying out the present technology will be described. The description will be given in the following order.
1. First Embodiment
2. Second Embodiment
3. Modification Example
4. Others 1. First Embodiment First, a first embodiment of the present technology will be described with reference to FIG. 1 to FIG. 16B.
<Configuration Example of Information Processing System 11>

Figure 1:
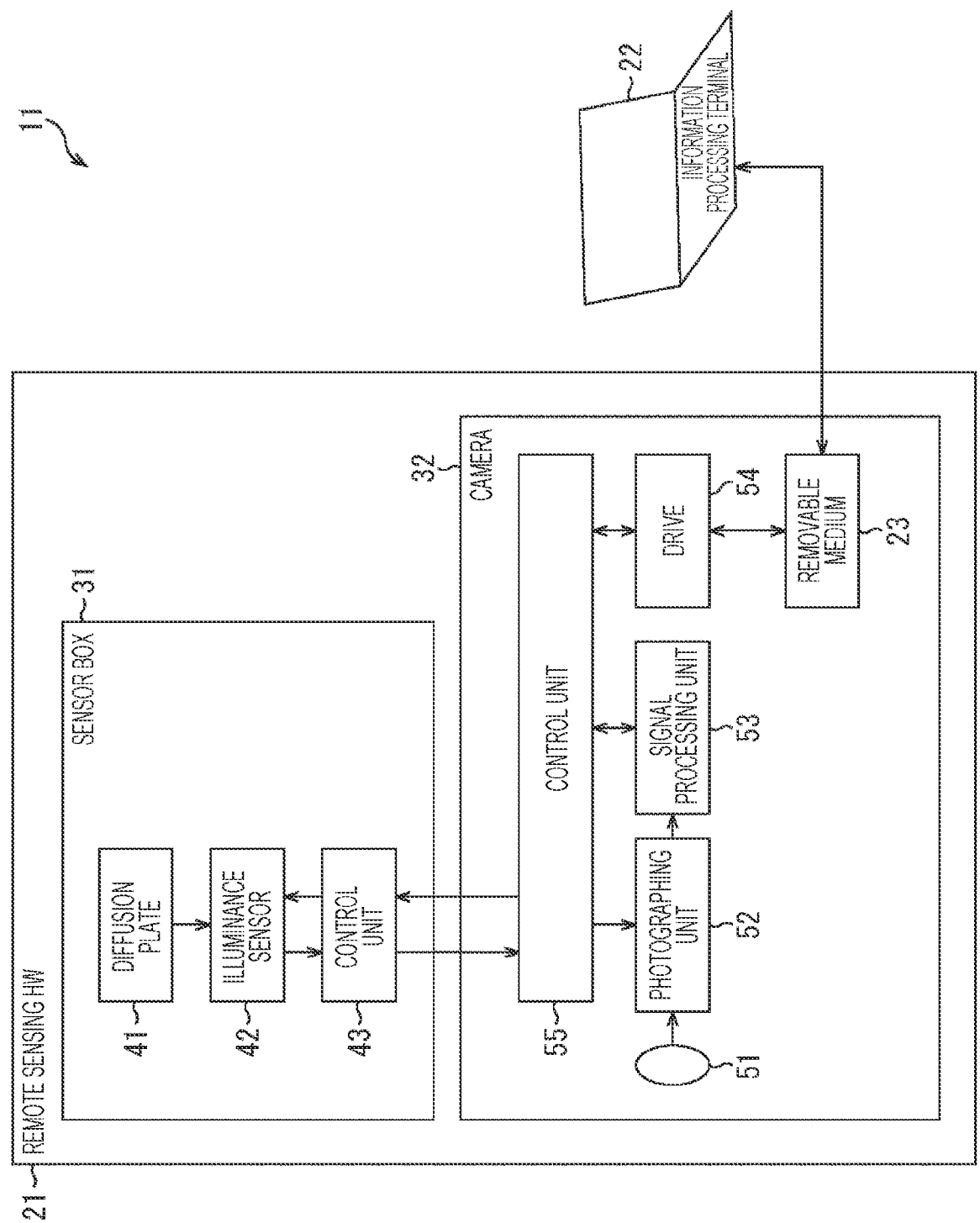
FIG. 1 is a block diagram illustrating a first embodiment of an information processing system to which the present technology is applied.

FIG. 1 illustrates a configuration example of an information processing system 11 to which the present technology is applied.

The information processing system 11, for example, is a system that senses a region to be an analysis target, such as an agricultural land (hereinafter, referred to as a sensing area), and calculates an evaluation index to be used for analyzing a sensing result. The information processing system 11 includes remote sensing hardware (HW) 21 and an information processing terminal 22.

The remote sensing HW 21 includes a sensor box 31 and a camera 32.

The sensor box 31 includes a diffusion plate 41, an illuminance sensor 42, and a control unit 43.

The diffusion plate 41 diffuses environment light, and thus, reduces unevenness in the brightness of the environment light incident on the illuminance sensor 42.

Here, for example, solar light is assumed as the environment light, but the environment light is not necessarily limited to the solar light. In addition, for example, the environment light may include light from a plurality of light sources.

Furthermore, hereinafter, a case where the environment light is the solar light, will be mainly described as an example.

The illuminance sensor 42 is a sensor that detects an illuminance of incident light (for example, the environment light) by using a light receiving element such as a photodiode. The illuminance sensor 42 is capable of setting a wavelength band for detecting the illuminance, and is also capable of setting a plurality of wavelength bands. In addition, the plurality of wavelength bands may overlap with each other. However, the number of detectable wavelength bands is limited to a certain degree (for example, less than or equal to 5).

For example, at least two wavelength bands of one wavelength band in a visible light region and one wavelength band in an infrared light region, are set to the wavelength band for detecting the illuminance. In addition, as described later with reference to FIG. 10, spectral characteristics of the environment light of each color temperature, are greatly changed in the vicinity of 450 nm. Accordingly, it is desirable that the wavelength band for detecting the illuminance, include a wavelength in the vicinity of 450 nm. In addition, the width of the wavelength band is not particularly limited, and for example, the wavelength band for detecting the illuminance may be a considerably narrow pinpoint wavelength (a single wavelength). Furthermore, hereinafter, a case will be described, in which the illuminance sensor 42 detects the illuminances of the environment light at each of a wavelength band in the vicinity of red light, wavelength band in the vicinity of green light, a wavelength band in the vicinity of blue light, and a wavelength band in a near-infrared light region.

In addition, the illuminance sensor 42, for example, includes a plurality of pixels, and does not have a function of detecting a distribution of illuminances in a spatial direction, unlike an image sensor that is capable of detecting the distribution of the luminance of a subject in the spatial direction.

The illuminance sensor 42 supplies data indicating detected values of the illuminances at each of the wavelength bands (hereinafter, referred to as illuminance data) to the control unit 43.

The control unit 43 controls a detection timing of the illuminance sensor 42 or the like in close coordination with a control unit 55 of the camera 32. In addition, the control unit 43 supplies the illuminance data to the control unit 55 of the camera 32.

The camera 32 includes an optical system 51, a photographing unit 52, a signal processing unit 53, a drive 54, and the control unit 55, and photographs the subject under the environment light.

The optical system 51 includes a lens or the like, and forms an image of the subject (the sensing area) on a light receiving surface of an image sensor 72 (FIG. 2) of the photographing unit 52.

The photographing unit 52 photographs the subject, and supplies the obtained sensing image to the signal processing unit 53, under the control of the control unit 55.

The signal processing unit 53 performs various signal processing with respect to the sensing image, and supplies the sensing image after the signal processing, to the control unit 55, under the control of the control unit 55.

The drive 54 drives a removable medium 23 under the control of the control unit 55. For example, the drive 54 stores sensing data including the sensing image and the illuminance data, in the removable medium 23.

The removable medium 23, for example, includes a storage medium that is detachable with respect to the drive 54, such as a magnetic disk, an optical disk, a magnetooptical disk, or a semiconductor memory.

The control unit 55 performs control of each unit of the camera 32 (for example, exposure control of the photographing unit 52, or the like). In addition, the control unit 55 performs synchronization control with respect to the sensor box 31, or the like.

<Configuration Example of Photographing Unit 52>

Figure 2:
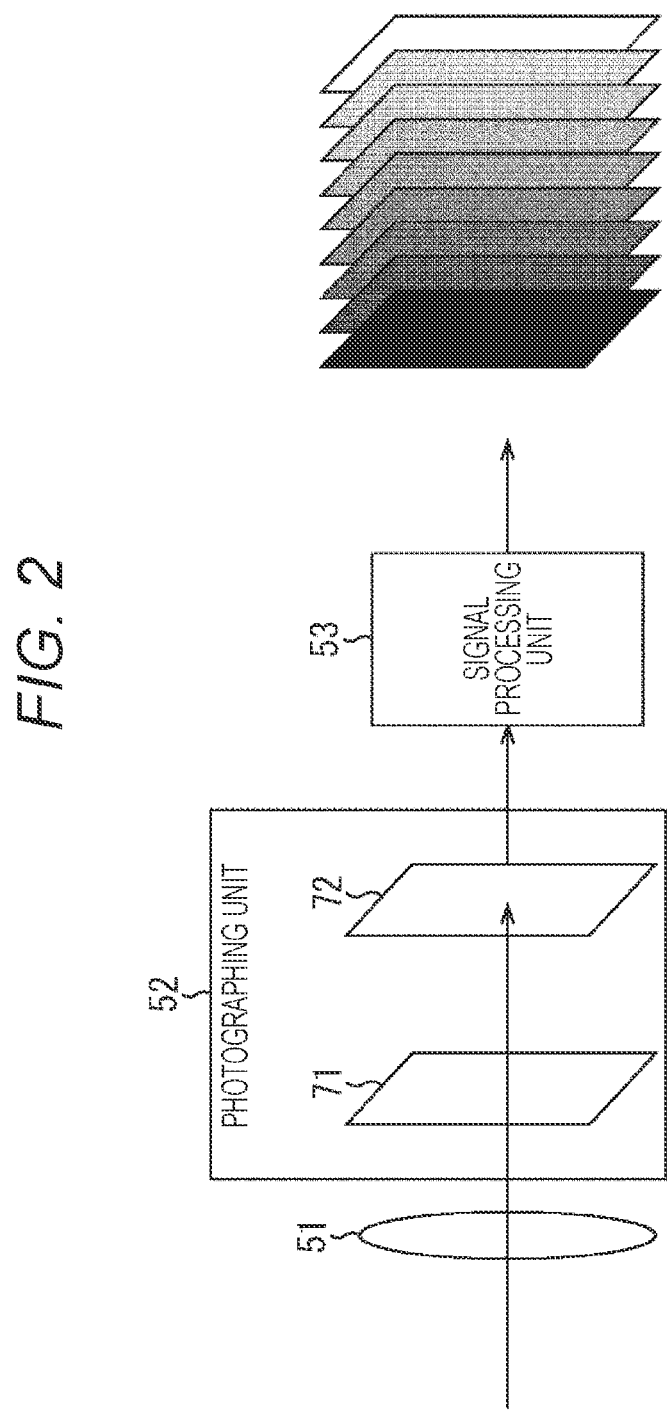
FIG. 2 is a block diagram illustrating a configuration example of a photographing unit.

FIG. 2 illustrates a configuration example of the photographing unit 52 of the camera 32. The photographing unit 52 includes a filter 71 and the image sensor 72.

The filter 71, for example, includes a multispectral filter or a hyperspectral filter that is capable of transmitting wavelengths in two or more predetermined narrow wavelength bands (narrow bands). In this case, the camera 32 is a multispectral camera or a hyperspectral camera. In addition, a specific example of such a filter includes a plasmon filter, a Fabry-Perot interferometer, and the like.

Furthermore, the number of wavelength bands transmitted through the filter 71 (hereinafter, referred to as a transmission band) can be set to an arbitrary number of greater than or equal to 2. In addition, the range of each of the transmission bands of the filter 71 can also be arbitrarily set.

Furthermore, each of the transmission bands of the filter 71 overlaps with at least the adjacent transmission band. In addition, the filter 71 is capable of including color filter of the related art of red, green, and blue (RGB), cyan, magenta, yellow, and green (CMYG), and the like.

The image sensor 72, for example, includes a CMOS image sensor, a CCD image sensor, and the like. The image sensor 72 photographs the sensing image including a component of the transmission band of the filter 71, and supplies the sensing image to the signal processing unit 53.

The signal processing unit 53 performs various signal processing with respect to the sensing image. For example, the signal processing unit 53 performs demosaic processing with respect to the sensing image, and performs interpolation processing of the components of each of the transmission bands of the filter 71, with respect to each pixel of the sensing image. With this arrangement, each of the pixels of the sensing image includes the components of each of the transmission bands of the filter 71, and thus, the sensing image is an image in which a plurality of images for each of the transmission bands of the filter 71 are superimposed. The signal processing unit 53 supplies the sensing image after the signal processing, to the control unit 55.

<Installation Example of Remote Sensing HW 21>

Figure 3:
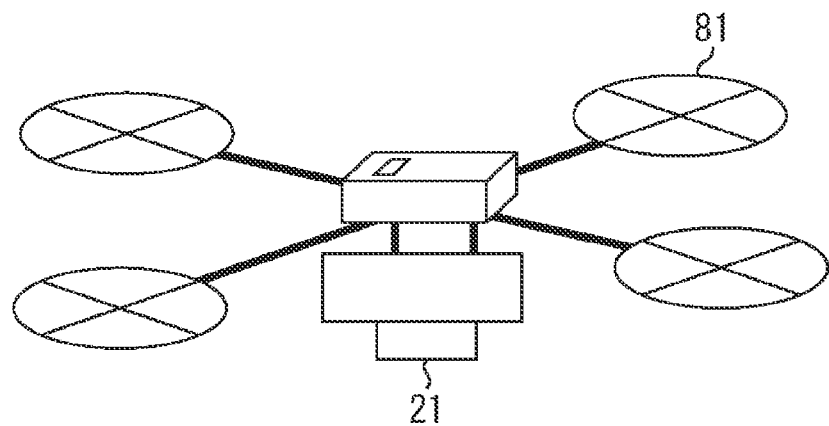
FIG. 3 is a diagram illustrating installation example of remote sensing HW.

FIG. 3 illustrates an installation example of the remote sensing HW 21.

The remote sensing HW 21, for example, is provided on a lower surface of a main body portion of a drone 81. Then, the remote sensing HW 21 performs remote photographing (remote sensing) with respect to the sensing area while looking down at the sensing area from the above.

<Configuration Example of Information Processing Terminal 22>

Figure 4:
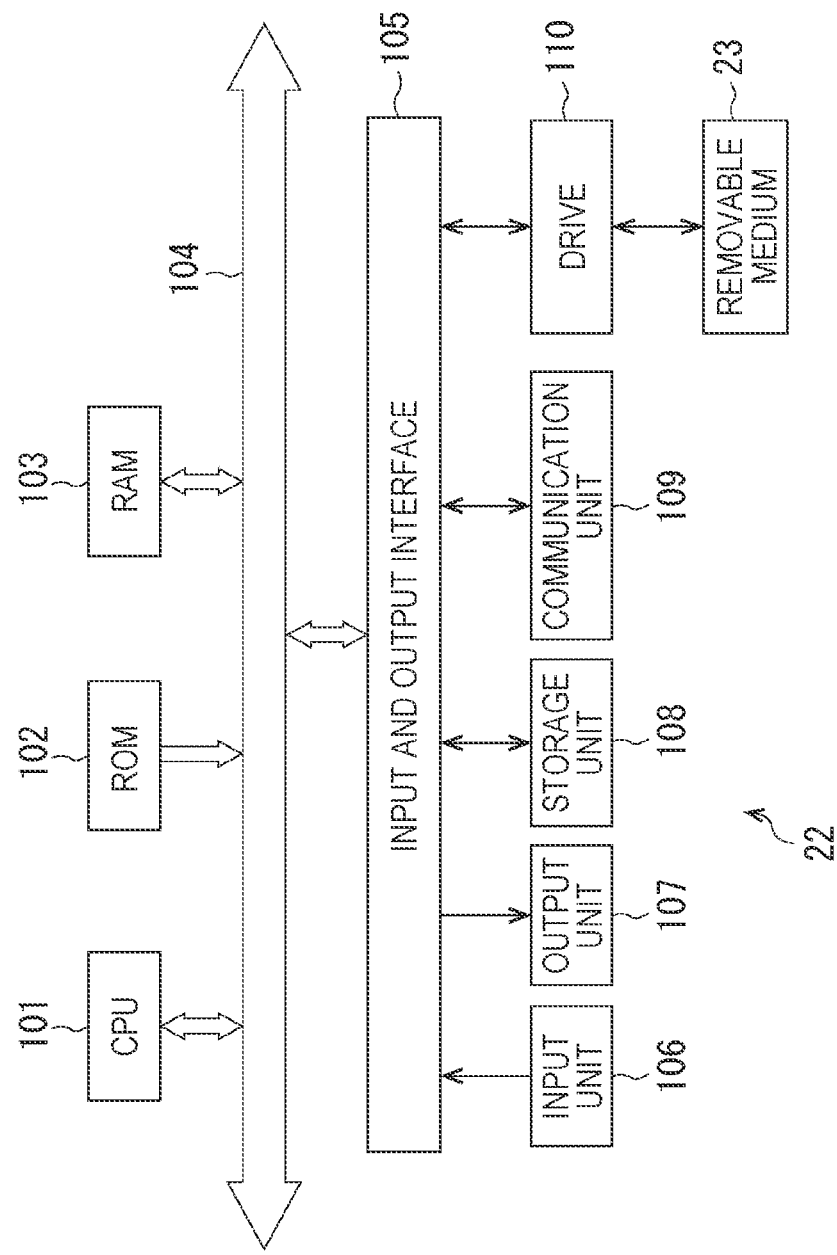
FIG. 4 is a block diagram illustrating a configuration example of an information processing terminal.

FIG. 4 illustrates a configuration example of a case where the information processing terminal 22 includes a personal computer (PC).

In the information processing terminal 22, a central processing unit (CPU) 101, a read only memory (ROM) 102, and a random access memory (RAM) 103 are connected to each other through a bus 104.

Further, an input and output interface 105 is connected to the bus 104. An input unit 106, an output unit 107, a storage unit 108, a communication unit 109, and a drive 110 are connected to the input and output interface 105.

The input unit 106 includes an input switch, a button, a microphone, an imaging element, and the like.

The output unit 107 includes a display, a speaker, and the like.

The storage unit 108 includes a hard disk, a non-volatile memory, and the like. In the storage unit 108, for example, an input table to be used for estimating the color temperature of the environment light, and an output table to be used for obtaining an irradiance of the environment light at each wavelength, are stored.

The communication unit 109 includes a network interface, a communication device, and the like.

The drive 110 drives the removable medium 23. For example, the drive 110 reads out the sensing data that is written by the remote sensing HW 21, from the removable medium 23.

Furthermore, hereinafter, in the case of describing the information processing terminal 22, the description of the bus 104 and the input and output interface 105 will be omitted. For example, in a case where the CPU 101 performs data exchange with respect to the communication unit 109 through the bus 104 and the input and output interface 105, it will be simply described that the CPU 101 performs the data exchange with respect to the communication unit 109.

<Configuration Example of Information Processing Unit 151>

Figure 5:
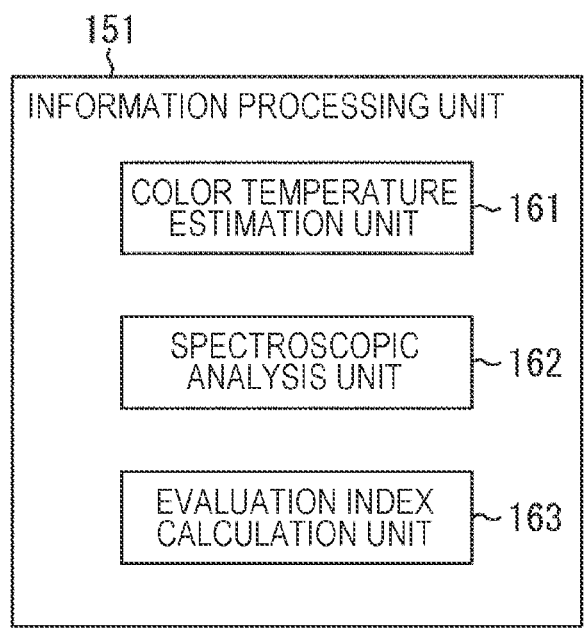
FIG. 5 is a block diagram illustrating a first embodiment of an information processing unit.

FIG. 5 illustrates a configuration example of an information processing unit 151 that is realized by executing a predetermined control program with the CPU 101 of the information processing terminal 22.

The information processing unit 151 includes a color temperature estimation unit 161, a spectroscopic analysis unit 162, and an evaluation index calculation unit 163.

The color temperature estimation unit 161 estimates the color temperature of the environment light, on the basis of the illuminance data and the input table.

The spectroscopic analysis unit 162 analyzes spectral characteristics of a reflection rate of the subject in the sensing image, on the basis of the color temperature of the environment light, the output table, and the sensing image.

The evaluation index calculation unit 163 calculates an evaluation index to be used for analyzing the subject, on the basis of the spectral characteristics of the reflection rate of the subject.

<First Embodiment of Evaluation Index Calculation Processing>

Next, a first embodiment of evaluation index calculation processing to be executed by the information processing terminal 22, will be described with reference to a flowchart of FIG. 6.

In Step S1, the information processing terminal 22 acquires the sensing data. For example, the removable medium 23 in which the sensing data is stored, is mounted on the drive 110 of the information processing terminal 22. The sensing data includes the sensing image obtained by photographing the sensing area with the remote sensing HW 21, and the illuminance data indicating the detected value of the illuminance of the environment light at the time of the photographing. The drive 110 reads out the sensing data from the removable medium 23, and supplies the sensing data to the CPU 101.

Here, spectral characteristics CO(λ) of the sensing image included in the sensing data are represented by Equation (1) described below, as illustrated in FIG. 7A. In addition, spectral characteristics SO(λ) of the illuminance data included in the sensing data, are represented by Equation (2) described below, as illustrated in FIG. 7B.

$$CO(\lambda) = L(\lambda) \times P(\lambda) \times C(\lambda) \qquad (1)$$

$$SO(\lambda) = L(\lambda) \times T(\lambda) \times S(\lambda) \qquad (2)$$

L(λ) represents the spectral characteristics of (a light source of) the environment light, P(λ) represents the spectral characteristics of the reflection rate of the subject in the sensing image, and C(λ) represents spectral characteristics of the camera 32 (the photographing unit 52). T(λ) represents spectral characteristics of the diffusion plate 41, and S(λ) represents spectral characteristics of the illuminance sensor 42.

In Step S2, the color temperature estimation unit 161 performs color temperature estimation processing.

Here, the details of the color temperature estimation processing will be described with reference to a flowchart of FIG. 8.

In Step S31, the color temperature estimation unit 161 detects an irradiance of the environment light in a visible light region.

According to Equation (2) described above, the spectral characteristics L(O) of the environment light are represented by Equation (3) described below.

$$L(\lambda) = SO(\lambda) / \{T(\lambda) \times S(\lambda)\} \qquad (3)$$

Therefore, for example, the color temperature estimation unit 161 calculates an irradiance L(λvis) of the environment light at a plurality of predetermined wavelengths λvis in the visible light region, by using Equation (4) described below. Furthermore, a combination of the plurality of wavelengths λvis, for example, is the same as a combination of wavelengths of which defined values of the irradiances in the visible light region are registered in the input table as described later.

[Math. 1]

$$L(\lambda vis) = K \times \begin{pmatrix} R \\ G \\ B \end{pmatrix} \times S^{-1}(\lambda vis) \times T^{-1}(\lambda vis) \qquad (4)$$

R, G, and B represent illuminances of the environment light at wavelength bands of red, green, and blue, detected by the illuminance sensor 42. $S^{-1}(\lambda vis)$ represents an inverse matrix of the spectral characteristics of the illuminance sensor 42. $T^{-1}(\lambda vis)$ represents an inverse matrix of the spectral characteristics of the diffusion plate 41. Furthermore, $S^{-1}(\lambda vis) \times T^{-1}(\lambda vis)$ is a matrix of 3×3 different for each of the wavelengths λvis. K represents a conversion coefficient for converting a calculation result into an irradiance (W/m$^2$).

Furthermore, the wavelength bands of red, green, and blue to be a detection target of the illuminance sensor 42, overlap with each other. Accordingly, according to Equation (4), the irradiance L(λvis) at an arbitrary wavelength λvis in the visible light region, can be calculated.

In Step S32, the color temperature estimation unit 161 detects an irradiance of the environment light in a near-infrared light region.

For example, the color temperature estimation unit 161 calculates an irradiance L(λnir) of the environment light at a predetermined wavelength λnir in the near-infrared light region, by using Equation (5) described below. Furthermore, the wavelength λnir, for example, is the same as a wavelength of which a defined value of the irradiance in the near-infrared light region is registered in the input table as described later.

$$L(\lambda nir) = Knir \times NIR \qquad (5)$$

NIR is an illuminance of the environment light at a wavelength band in the near-infrared light region, detected by the illuminance sensor 42. Knir represents a coefficient including $S^{-1}(\lambda nir) \times T^{-1}(\lambda nir)$, and a conversion coefficient for converting a calculation result into an irradiance (W/m$^2$).

In Step S33, the color temperature estimation unit 161 estimates the color temperature of the environment light.

Figure 9A:
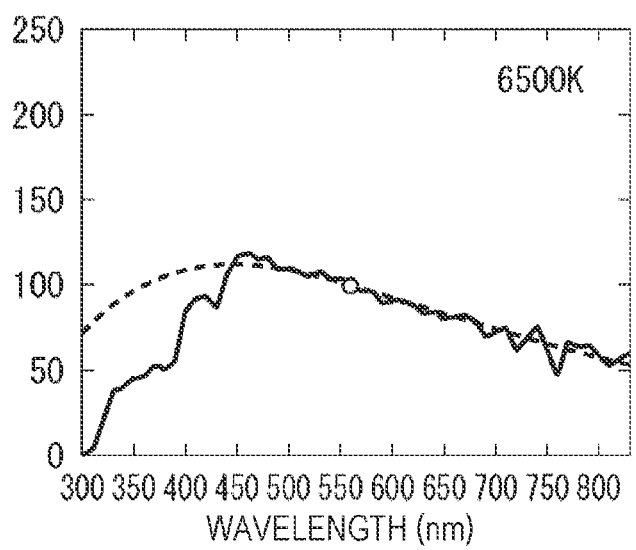
FIGS. 9A to 9C are graphs illustrating spectral characteristics of light of each color temperature, emitted from a D65 light source and a black body.
Figure 9B:
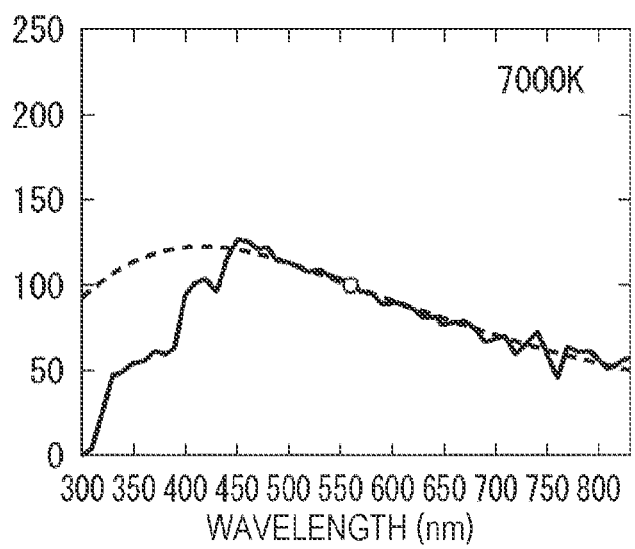
Figure 9C:
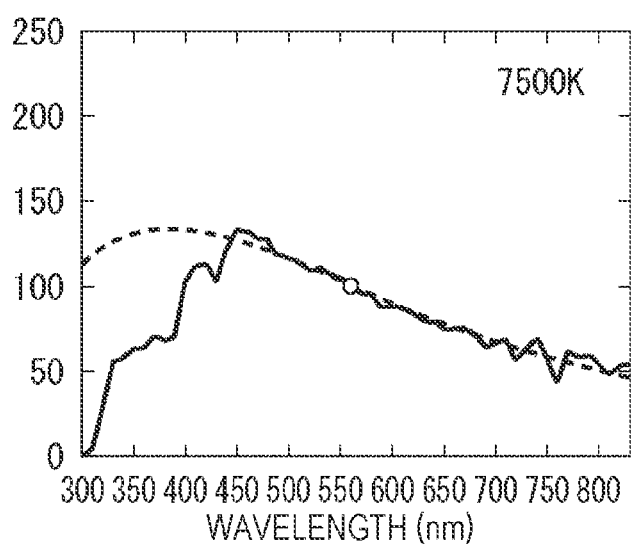

FIGS. 9A to 9C are graphs illustrating spectral characteristics for each color temperature of light emitted from a D65 light source (≅daytime solar light) and light from a black body. In each of the graphs, a horizontal axis represents a wavelength (unit is nm), and a vertical axis represents an irradiance. FIGS. 9A to C respectively illustrate spectral characteristics in a case where the color temperatures are 6500 K, 7000 K, and 7500 K. A solid line graph illustrates the spectral characteristics of the light emitted from the D65 light source, and a dotted line graph illustrates spectral characteristics of the light emitted from the black body. Furthermore, the spectral characteristics are respectively normalized such that the value of an irradiance at 560 nm is 100.

As illustrated in this example, in general, the spectral distribution of the light of each color temperature, are represented by a distribution of the irradiances in the visible light region.

On the other hand, in the present technology, as illustrated in FIG. 10, a spectral distribution of the environment light of each color temperature, extends to the near-infrared light region.

Specifically, FIG. 10 illustrates the spectral characteristics of the environment light of which the color temperature is 6500 K, 7000 K, and 7500 K. In FIG. 10, a horizontal axis represents a wavelength (unit is nm), and a vertical axis represents an irradiance (unit is W/m$^2$).

In the spectral characteristics, the range extends to the near-infrared light region in which a wavelength is greater than or equal to 800 nm, as illustrated in a portion surrounded by a square in the drawing. Then, the color temperature estimation unit 161 estimates the color temperature of the environment light, by using the spectral characteristics of the environment light not only in the visible light region but also in the near-infrared light region.

Specifically, the color temperature estimation unit 161 reads out the input table from the storage unit 108.

FIG. 11 illustrates an example in which the input table is illustrated as a graph. In FIG. 11, a horizontal axis represents a wavelength (unit is nm), and a vertical axis represents an irradiance (unit is W/m$^2$).

For example, the input table includes the defined values of the irradiances of the environment light of each of the color temperatures at the plurality of predetermined wavelengths. The defined value of each of the irradiances, for example, is set on the basis of a result actually measured in advance. In addition, the input table includes not only the defined value of the irradiance of the environment light of each of the color temperatures in the visible light region, but also the defined value of the irradiance in the near-infrared light region. That is, the input table includes each of the defined values of the irradiances in at least two wavelengths of one wavelength in the visible light region, and one wavelength in the infrared light region, with respect to each environment light of each of the color temperatures. In response, the color temperature estimation unit 161 detects the irradiances of the environment light in at least two wavelengths of one wavelength in the visible light region and one wavelength in the infrared light region, in the processing of Step S31 and Step S32 described above.

Furthermore, as illustrated in FIG. 10 described above, the spectral characteristics of the environment light of each of the color temperatures are greatly changed in the vicinity of 450 nm. Accordingly, it is desirable that the input table include at least the defined value of the irradiance of the environment light of each of the color temperatures at a wavelength in the vicinity of 450 nm. In addition, it is desirable that in the input table, the defined value of the irradiance in the vicinity of 450 nm, be tightly set.

The color temperature estimation unit 161 calculates each degree of similarity between a data set of the calculated irradiance $L(\lambda vis)$ and irradiance $L(\lambda nir)$, and a data set of the irradiances of the environment light of each of the color temperatures in the input table. In the degree of similarity, for example, a difference absolute value sum is used. Then, the color temperature estimation unit 161 estimates that a color temperature having the highest degree of similarity, is the current color temperature of the environment light.

Thus, a comparison is performed by including not only the irradiance in the visible light region but also the irradiance in the near-infrared light region, and thus, an estimation accuracy of the color temperature is improved.

After that, the color temperature estimation processing is ended.

Returning to FIG. 6, in Step S3, the spectroscopic analysis unit 162 obtains the spectral characteristics of the environment light.

Specifically, the spectroscopic analysis unit 162 reads out the output table from the storage unit 108.

Figure 12:
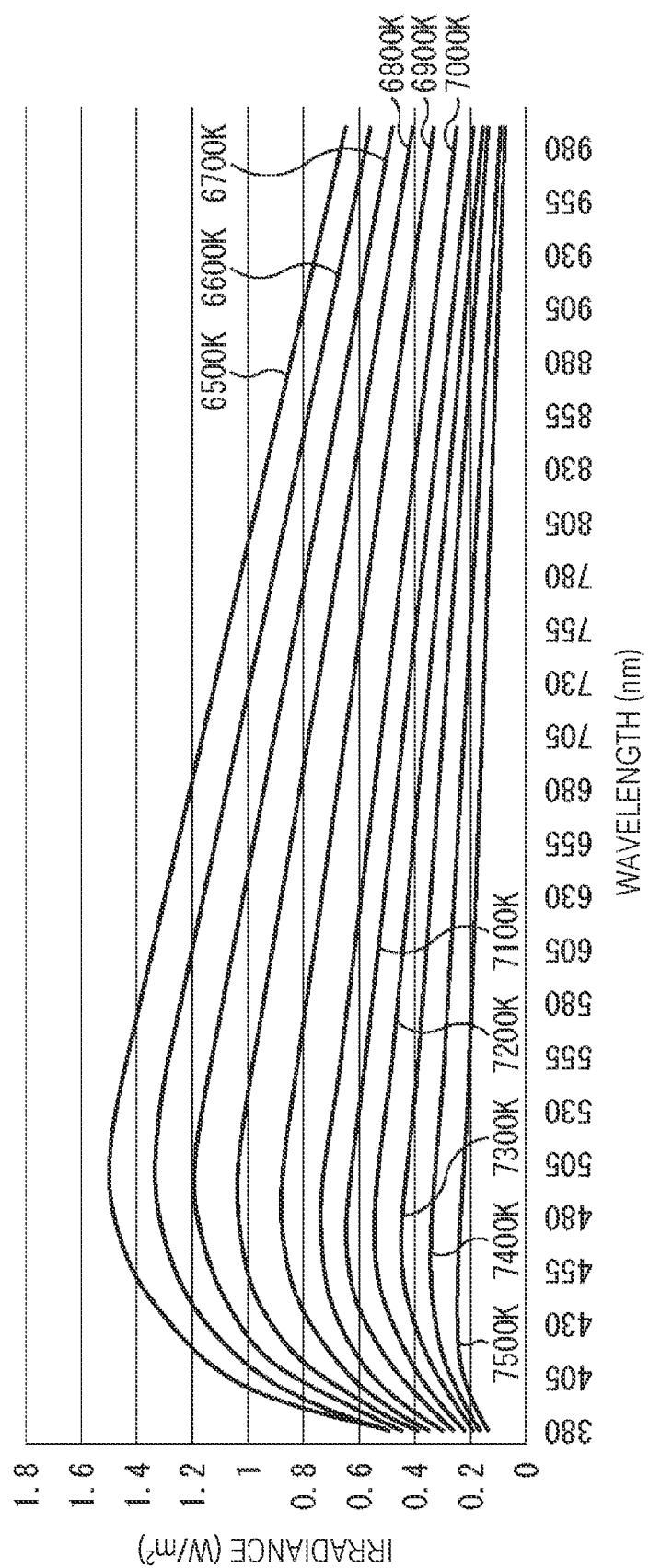
FIG. 12 is a diagram in which a first embodiment of an output table is illustrated as a graph.

FIG. 12 illustrates an example in which the output table is illustrated as a graph. In FIG. 12, a horizontal axis represents a wavelength (unit is nm), and a vertical axis represents an irradiance (unit is W/m$^2$).

For example, the output table includes the defined values of the irradiances of the environment light of each of the color temperatures at each of the wavelengths. The defined value of each of the irradiances, for example, is set by being measured or calculated in advance.

FIG. 12 illustrates the spectral characteristics of the environment light of each of the color temperatures at an interval of 100 K from 6500 K to 7500 K. In the output table, the spectral characteristics of the environment light of each of the color temperatures are converted into data, that is, data indicating the irradiances of the environment light of each of the color temperatures at each of the wavelengths, is included. Furthermore, the range of the wavelength in the output table, for example, includes the visible light region and the near-infrared light region, and for example, is a range of 380 nm to 1000 nm. In addition, the output table includes the defined values of the irradiances of the environment light of each of the color temperatures at a wavelength at a predetermined interval (for example, 1 nm).

Then, the spectroscopic analysis unit 162 obtains an irradiance $L(\lambda i)$ and an irradiance $L(\lambda j)$ of the environment light at two wavelengths of a wavelength $\lambda i$ and a wavelength $\lambda j$ to be used in the evaluation index, on the basis of the spectral characteristics of the environment light of the color temperature estimated by the color temperature estimation unit 161, in the spectral characteristics of the environment light of each of the color temperatures, included in the output table.

Figure 13A:
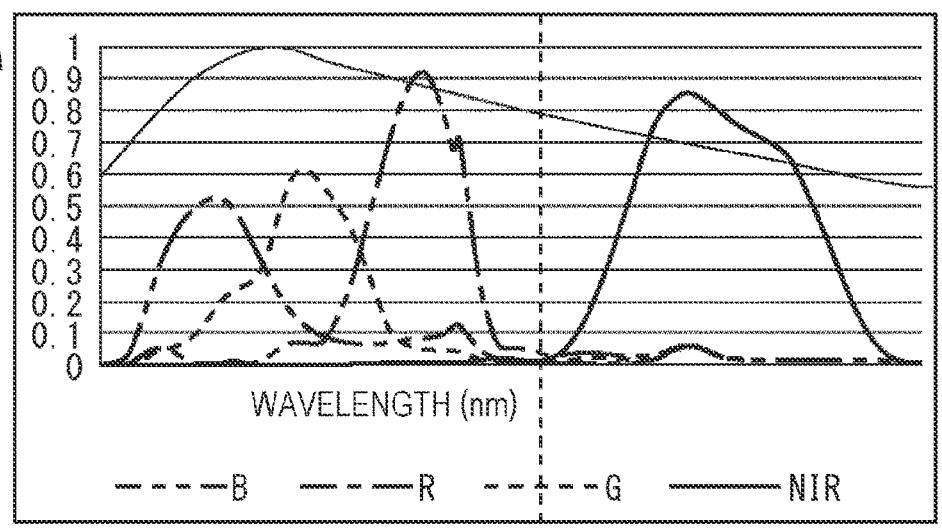
FIGS. 13A to 13C are diagrams for describing a procedure of obtaining the spectral characteristics of the environment light.
Figure 13B:
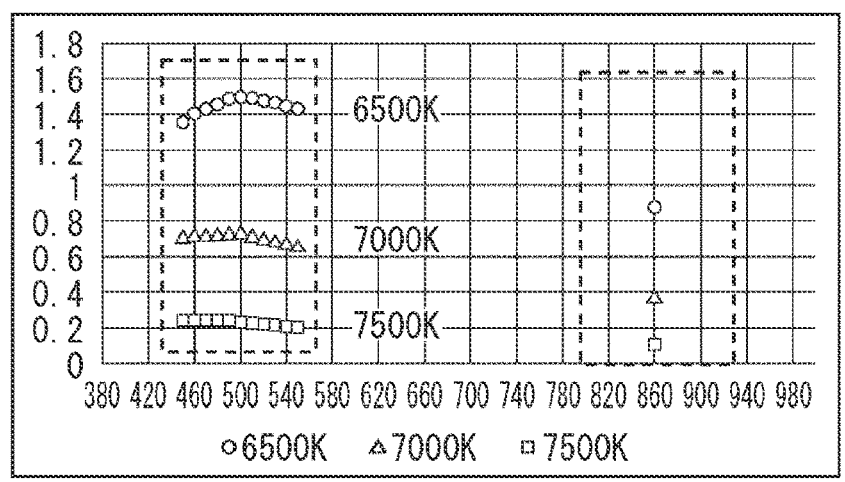
Figure 13C:
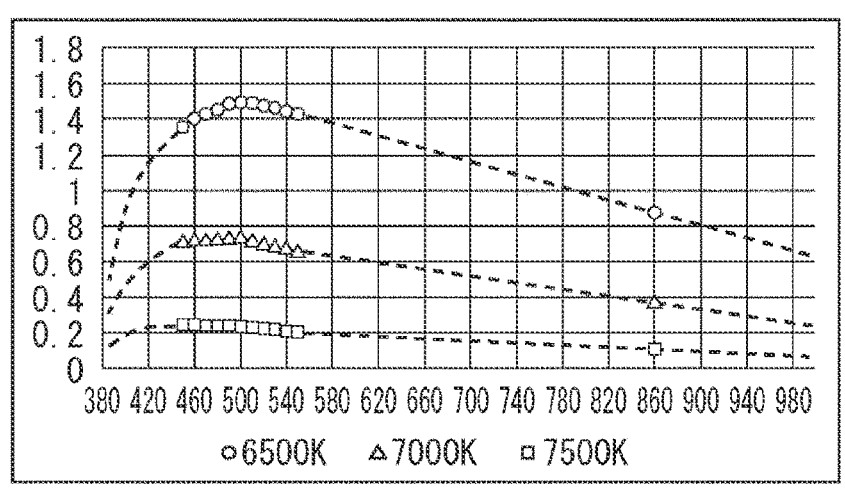

FIGS. 13A to 13C simply illustrate the procedure of obtaining the spectral characteristics of the environment light, as described above.

First, FIG. 13A illustrates the spectral characteristics of the illuminance sensor 42 and the environment light. In FIG. 13A, a horizontal axis represents a wavelength (unit is nm), and a vertical axis represents an irradiance (unit is W/m$^2$).

As illustrated in FIG. 13A, the illuminance sensor 42 has a sensitivity with respect to a wavelength band of red (R), a wavelength band of green (G), a wavelength band of blue (B), and a wavelength band of near-infrared light (NIR). Then, each illuminance of the environment light in the wavelength band to which the illuminance sensor 42 has a sensitivity, is detected.

Next, as illustrated in FIG. 13B, the irradiances of the environment light at a plurality of predetermined wavelengths, are calculated on the basis of the detected value of the illuminance of the environment light. Then, a calculated value of the irradiance of the environment light is compared with the defined value of the irradiance of the environment light of each of the color temperatures in the input table, and thus, the color temperature of the environment light is estimated.

Then, as illustrated in FIG. 13C, the irradiance of the environment light at a wavelength to be used in the evaluation index, is obtained on the basis of the spectral characteristics of the environment light of the estimated color temperature, in the spectral characteristics of the environment light of each of the color temperatures, registered in the output table.

Returning to FIG. 6, in Step S4, the spectroscopic analysis unit 162 obtains the spectral characteristics of the reflection rate of the subject.

For example, the spectroscopic analysis unit 162 performs the following calculation with respect to each of the pixels of the sensing image.

Specifically, the spectroscopic analysis unit 162 calculates luminance (a component) $CO(\lambda i)$ at the wavelength $\lambda i$ and luminance (a component) $CO(\lambda j)$ at the wavelength $\lambda j$ of each of the pixels.

Furthermore, for example, the transmission bands of the filter 71 overlap with each other. Accordingly, it is possible to calculate the luminance $CO(\lambda)$ at an arbitrary wavelength, on the basis of the sensing image, at a wavelength band between the minimum value and the maximum value of the transmission bands of the filter 71.

Next, the spectroscopic analysis unit 162 calculates a reflection rate $P(\lambda i)$ and a reflection rate $P(\lambda j)$ of the subject with respect to the light at the wavelength $\lambda i$ and the wavelength $\lambda j$, according to Equation (6) and Equation (7), described below.

$$P(\lambda i)=CO(\lambda i)/\{C(\lambda i)\times L(\lambda i)\} \quad (6)$$

$$P(\lambda j)=CO(\lambda j)/\{C(\lambda j)\times L(\lambda j)\} \quad (7)$$

With this arrangement, calibration is performed with respect to the spectral characteristics $L(\lambda)$ of the environment light and the spectral characteristics $C(\lambda)$ of the camera 32. That is, the influence of the spectral characteristics $L(\lambda)$ of the environment light and the spectral characteristics $C(\lambda)$ of the camera 32 is eliminated from the reflection rate $(\lambda)$ of the subject, and thus, the reflection rate $(\lambda)$ of the subject is detected with a higher accuracy.

In Step S5, the evaluation index calculation unit 163 calculates the evaluation index. For example, the evaluation index calculation unit 163 calculates a normalized difference spectral index (NDSI) as the evaluation index, by using Equation (8) described below.

$$NDSI(\lambda i, \lambda j) = \{P(\lambda i) - P(\lambda j)\} / \{P(\lambda i) + P(\lambda j)\} \quad (8)$$

After that, the evaluation index calculation processing is ended.

As described above, it is possible to easily and accurately estimate the color temperature of the environment light, by only using the inexpensive illuminance sensor 42. As a result, the spectral characteristics of the environment light can be easily and accurately detected, and the calibration can be performed with respect to the environment light. In addition, a detection accuracy of the spectral characteristics of the environment light is improved, a calibration accuracy of the spectral characteristics of the reflection rate of the subject with respect to the environment light is improved, and an accuracy of the evaluation index is improved.

Here, another detection method of the spectral characteristics of the environment light will be simply described with reference to FIG. 14A to FIG. 16B, as a comparison target of the present technology.

First, a method of detecting the spectral characteristics of the environment light by using a spectroscope that is capable of directly detecting the spectrum of the environment light, will be described with reference to FIGS. 14A and 14B.

As illustrated in FIG. 14A, the spectral characteristics $CO(\lambda)$ of the sensing image are represented by Equation (9) similar to Equation (1) described above.

$$CO(\lambda) = L(\lambda) \times P(\lambda) \times C(\lambda) \quad (9)$$

On the other hand, as illustrated in FIG. 14B, the spectral characteristics $SO(\lambda)$ of the data output from the spectroscope, are represented by Equation (10) described below.

$$SO(\lambda) = L(\lambda) \times S(\lambda) \quad (10)$$

Here, S(L) represents spectral characteristics of the spectroscope.

Accordingly, the spectral characteristics $L(\lambda)$ of the environment light are obtained by Equation (11) described below.

$$L(\lambda) = SO(\lambda) / S(\lambda) \quad (11)$$

In such a method, it is possible to detect the spectral characteristics $L(\lambda)$ of the environment light with a high accuracy, by using the spectroscope. However, the spectroscope includes a diffraction grating or the like, and thus, is expensive, and as a result, the entire system becomes expensive.

Next, a method of photographing a reflection plate along with the sensing area by the camera 32, and of detecting the spectral characteristics of the environment light on, the basis of an image obtained by photographing the reflection plate, will be described with reference to FIGS. 15A and 15B. This is a method similar to that of PTL 1 described above.

As illustrated in FIG. 15A, spectral characteristics $CO1(\lambda)$ of the image of the sensing area in the sensing image are represented by Equation (12) similar to Equation (1) described above.

$$CO1(\lambda) = L(\lambda) \times P(\lambda) \times C(\lambda) \quad (12)$$

On the other hand, as illustrated in FIG. 15B, spectral characteristics $CO2(\lambda)$ of the image of the reflection plate in the sensing image are represented by Equation (13) described below.

$$CO2(\lambda) = L(\lambda) \times R(\lambda) \times C(\lambda) \quad (13)$$

Here, $R(\lambda)$ is spectral characteristics of the reflection plate.

Accordingly, the spectral characteristics $L(\lambda)$ of the environment light are obtained by Equation (14) described below.

$$L(\lambda) = CO2(\lambda) / \{R(\lambda) \times C(\lambda)\} \quad (14)$$

In such a method, it is sufficient that only one camera 32 is provided, and it is not necessary that another spectroscope or another illuminance sensor is provided. However, as described above, it is difficult to simultaneously photograph the sensing area and the reflection plate at all times. For example, in the case of photographing the sensing area from the above by mounting the camera 32 on the drone, it is difficult to provide the reflection plate such that the reflection plate is photographed along with the sensing area, at all times.

Next, a method of using two cameras 32 to photograph the sensing area with one camera 32 and to photograph the airspace through the diffusion plate with the other camera 32, and of detecting the spectral characteristics of the environment light, on the basis of an image obtained by photographing the airspace (hereinafter, referred to as an environment light image), will be described with reference to FIGS. 16A and 16B.

As illustrated in FIG. 16A, the spectral characteristics $CO1(\lambda)$ of the sensing image are represented by Equation (15) similar to Equation (1) described above.

$$CO1(\lambda) = L(\lambda) \times P(\lambda) \times C(\lambda) \quad (15)$$

On the other hand, as illustrated in FIG. 16B, the spectral characteristics $CO2(\lambda)$ of the environment light image are represented by Equation (16) described below.

$$CO2(\lambda) = L(\lambda) \times T(\lambda) \times C(\lambda) \quad (16)$$

Here, $T(\lambda)$ represents spectral characteristics of a diffusion plate.

Accordingly, the spectral characteristics $L(\lambda)$ of the environment light are obtained by Equation (17) described below.

$$L(\lambda) = CO2(\lambda) / \{T(\lambda) \times C(\lambda)\} \quad (17)$$

In such a method, the detection accuracy of the spectral characteristics of the environment light is improved. However, it is necessary to use two cameras 32, and thus, the entire system becomes large and expensive.

In response, in the present technology, it is possible to easily detect the spectral characteristics of the environment light with a constant accuracy in an inexpensive system. As a result, a detection accuracy of the spectral characteristics of the reflection rate of the subject is improved. In addition, the accuracy of the evaluation index using the spectral characteristics of the reflection rate of the subject, is improved.

2. Second Embodiment

Next, a second embodiment of the present technology will be described with reference to FIG. 17 to FIG. 23.

<Configuration Example of Information Processing System 301>

Figure 17:
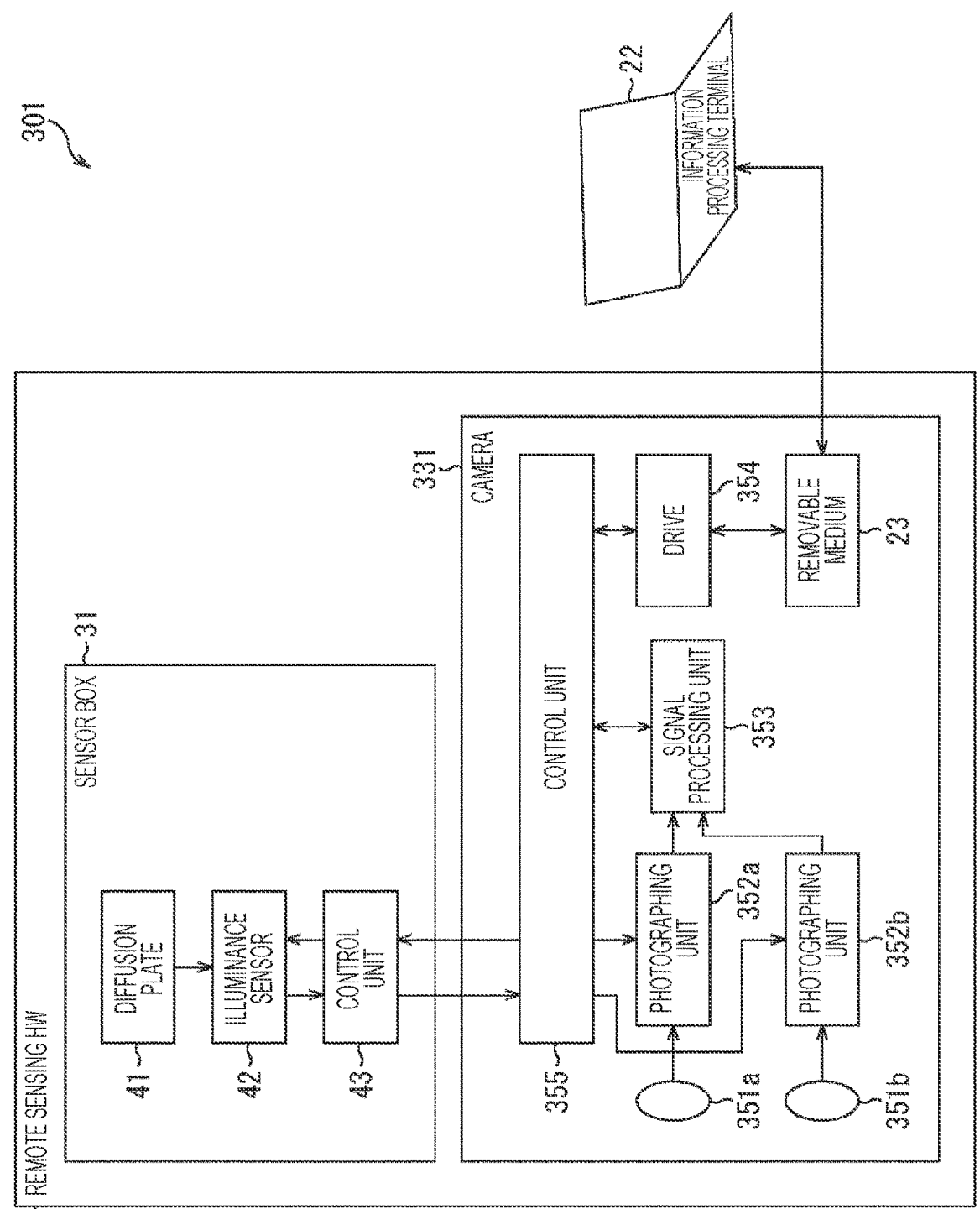
FIG. 17 is a block diagram illustrating a second embodiment of the information processing system to which the present technology is applied.

FIG. 17 illustrates a configuration example of an information processing system 301 to which the present technology is applied. Furthermore, in the drawing, the same reference numerals will be applied to portions corresponding to those of the information processing system 11 of FIG. 1, and the description thereof will be suitably omitted.

The information processing system 301 is different from the information processing system 11, in that a remote sensing HW 321 is provided instead of the remote sensing HW 21. The remote sensing HW 321 is different from the remote sensing HW 21, in that a camera 331 is provided instead of the camera 32.

The camera 331 is a camera that detects a specific wavelength band, and is used for a specific application. The camera 331 includes an optical system 351a, an optical system 351b, a photographing unit 352a, a photographing unit 352b, a signal processing unit 353, a drive 354, and a control unit 355.

The optical system 351a includes a lens or the like, and forms the image of the subject (the sensing area) on a light receiving surface of an image sensor (not illustrated) of the photographing unit 352a.

The optical system 351b includes a lens or the like, and forms the image of the subject (the sensing area) on a light receiving surface of an image sensor (not illustrated) of the photographing unit 352b.

The photographing unit 352a includes a bandpass filter transmitting a red wavelength band, and an image sensor. The photographing unit 352a photographs the subject, and supplies an image including a red component of the subject (hereinafter, referred to as a red sensing image), to the signal processing unit 353, under the control of the control unit 355.

The photographing unit 352b includes a bandpass filter transmitting a predetermined wavelength band of near-infrared light, and an image sensor. The photographing unit 352b photographs the subject, and supplies a sensing image including a near-infrared light component of the subject (hereinafter, referred to as a near-infrared sensing image), to the signal processing unit 353, under the control of the control unit 355.

The signal processing unit 353 performs various signal processing with respect to the red sensing image and the near-infrared sensing image, and supplies the sensing image after the signal processing, to the control unit 355, under the control of the control unit 355. For example, the signal processing unit 353 synthesizes the red sensing image and the near-infrared sensing image, and generates a synthetic sensing image.

The drive 354 drives the removable medium 23 under the control of the control unit 355. For example, the drive 354 stores sensing data including the synthetic sensing image and the illuminance data, in the removable medium 23.

The control unit 355 performs control of each unit of the camera 331 (for example, the exposure control of the photographing unit 52, or the like). In addition, the control unit 355 performs the synchronization control with respect to the sensor box 31, or the like.

<Configuration Example of Information Processing Unit 401>

Figure 18:
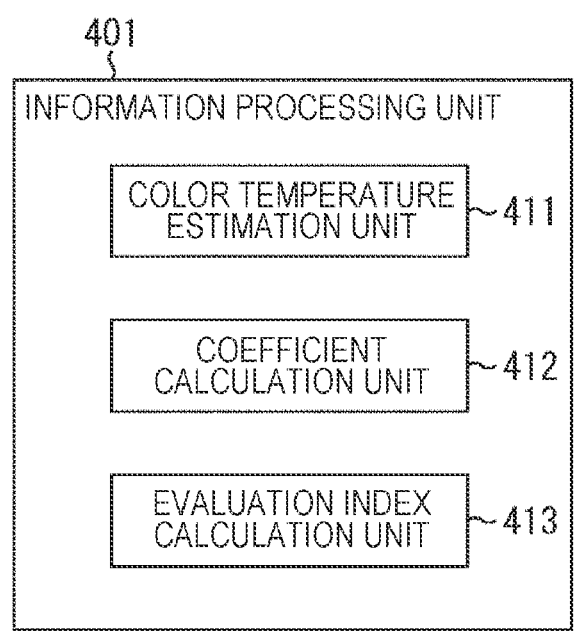
FIG. 18 is a block diagram illustrating a second embodiment of the information processing unit.

FIG. 18 illustrates a configuration example of an information processing unit 401 that is realized by executing a predetermined control program with the CPU 101 of the information processing terminal 22.

The information processing unit 401 includes a color temperature estimation unit 411, a coefficient calculation unit 412, and an evaluation index calculation unit 413.

The color temperature estimation unit 411 estimates the color temperature of the environment light, on the basis of the illuminance data, and an input table as described later.

The coefficient calculation unit 412 calculates a spectral coefficient to be used for calculating the evaluation index, on the basis of the color temperature of the environment light, and an output table as described later.

The evaluation index calculation unit 413 calculates the evaluation index to be used for analyzing the subject, on the basis of the sensing image and the spectral coefficient.

<Second Embodiment of Evaluation Index Calculation Processing>

Figure 19:
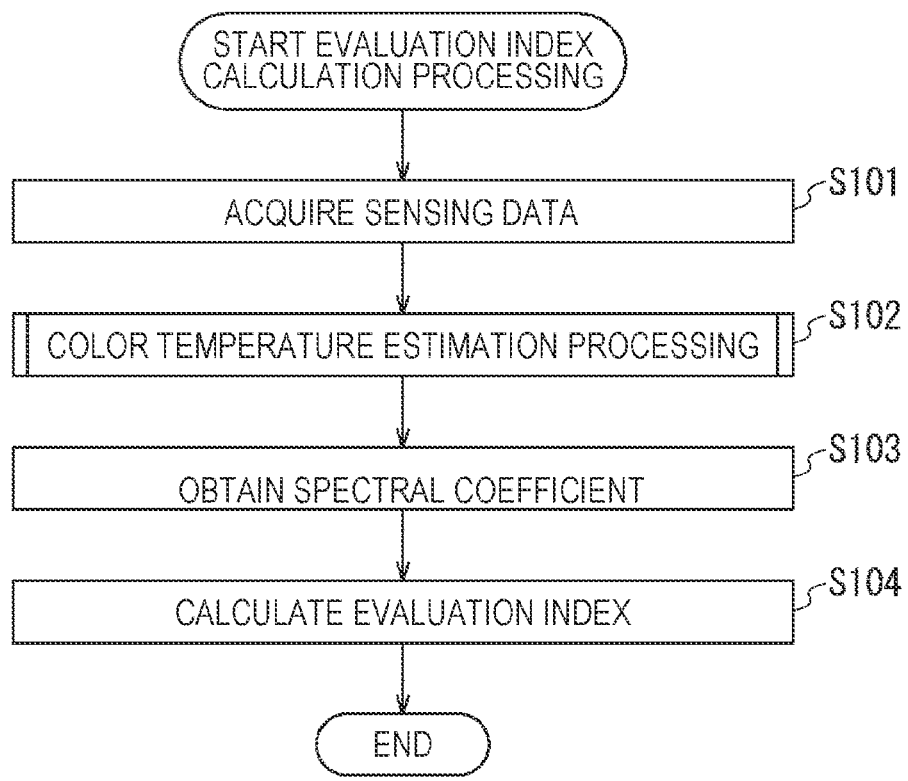
FIG. 19 is a flowchart for describing a second embodiment of the evaluation index calculation processing.
Figure 20:
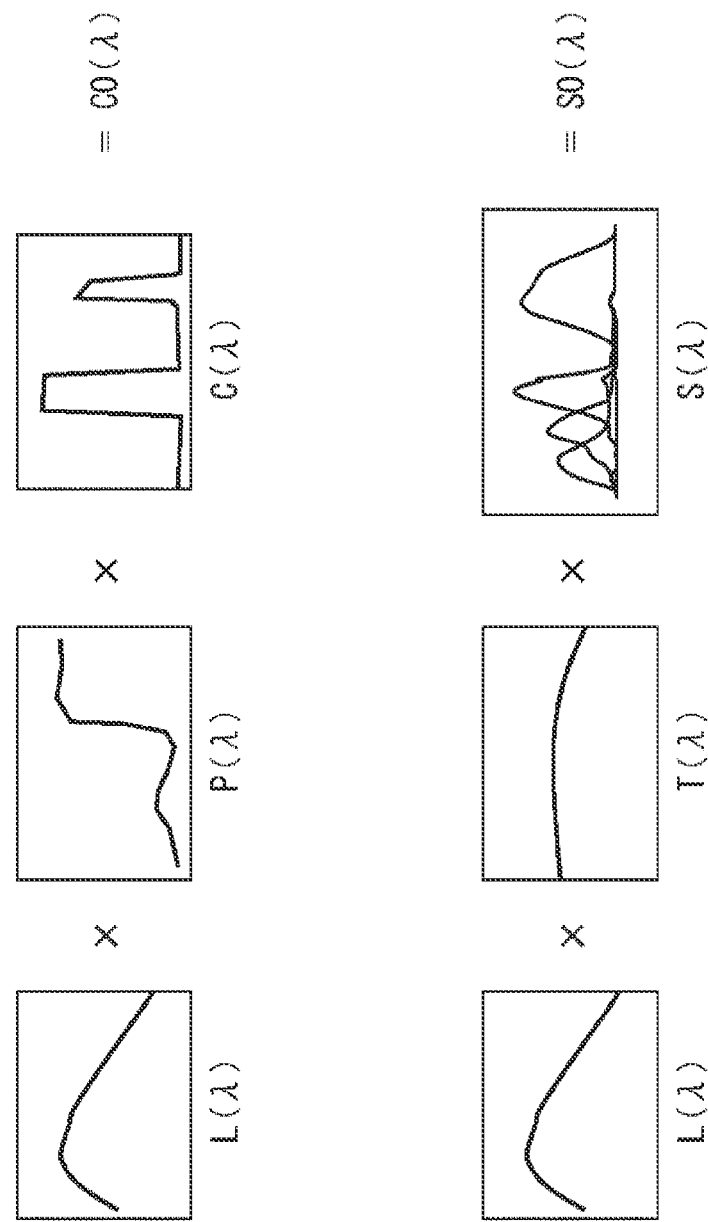
FIGS. 20A and 20B are diagrams illustrating a sensing image and a calculation equation of spectral characteristics of illuminance data.

Next, a second embodiment of the evaluation index calculation processing to be executed by the information processing terminal 22, will be described with reference to a flowchart of FIG. 19.

Figure 6:
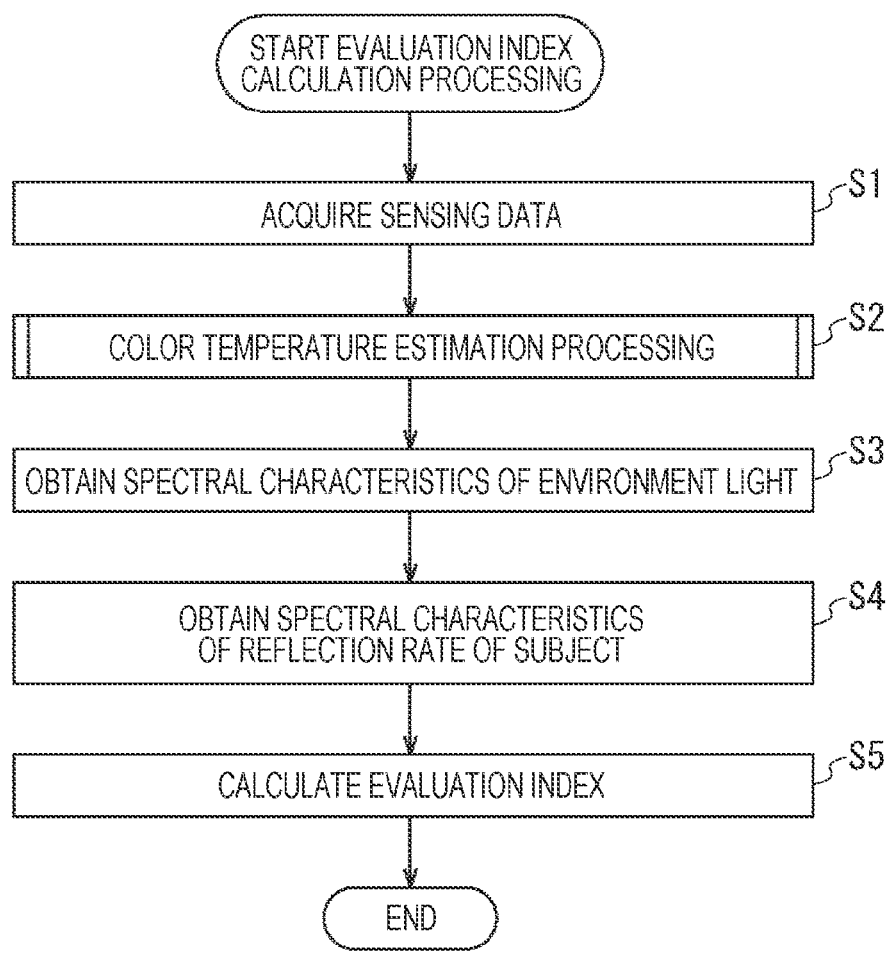
FIG. 6 is a flowchart for describing a first embodiment of evaluation index calculation processing.

In Step S101, as with the processing of Step S1 of FIG. 6, the sensing data is acquired.

Here, spectral characteristics $CO(\lambda)$ of the synthetic sensing image included in the sensing data are represented by Equation (18) described below, as illustrated in FIG. 20A. In addition, spectral characteristics $SO(\lambda)$ of the illuminance data included in the sensing data are represented by Equation (19) described below, as illustrated in FIG. 20B.

$$CO(\lambda)=L(\lambda)\times P(\lambda)\times C(\lambda) \tag{18}$$

$$SO(\lambda)=L(\lambda)\times T(\lambda)\times S(\lambda) \tag{19}$$

$C(\lambda)$ represents spectral characteristics of the camera 331, and the others are similar to those of Equation (1) and Equation (2) described above.

In Step S102, the color temperature estimation unit 161 performs the color temperature estimation processing.

Figure 21:
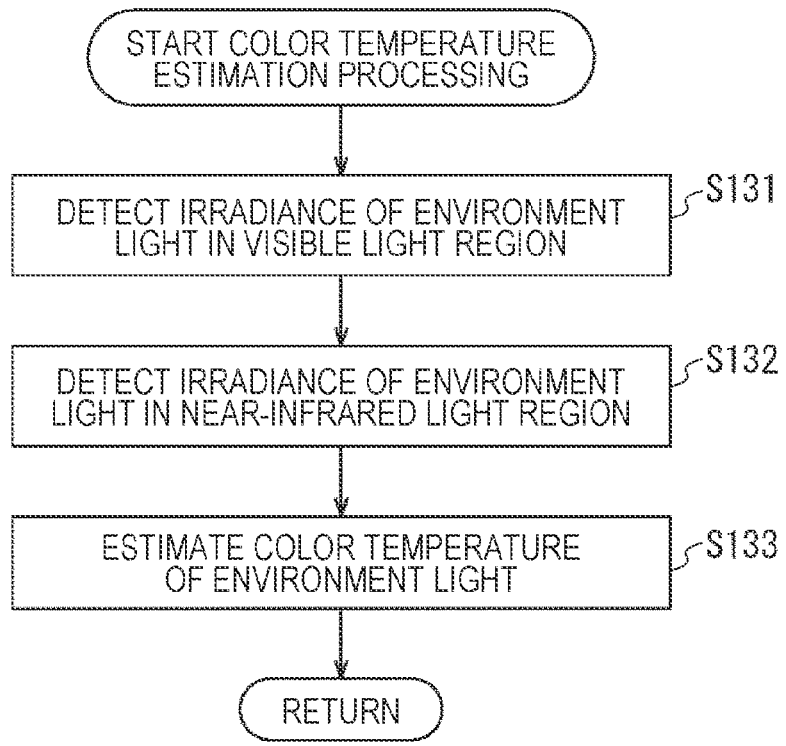
FIG. 21 is a flowchart for describing the details of color temperature estimation processing of FIG. 19.

Here, the details of the color temperature estimation processing will be described with reference to a flowchart of FIG. 21.

In Step S131, the color temperature estimation unit 411 detects the irradiance of the environment light in the visible light region. Specifically, the color temperature estimation unit 411 calculates an irradiance $L(\lambda r)$, an irradiance $L(\lambda g)$, and an irradiance $L(\lambda b)$ of the environment light at a red wavelength $\lambda r$, a green wavelength $\lambda g$, and a blue wavelength $\lambda b$, by using Equation (20) to Equation (22) described below.

$$L(\lambda r)=Kr\times R \tag{20}$$

$$L(\lambda g)=Kg\times G \tag{21}$$

$$L(\lambda b)=Kb\times B \tag{22}$$

Kr is a coefficient including $S^{-1}(\lambda r)\times T^{-1}(\lambda r)$, and a conversion coefficient for converting a calculation result into an irradiance (W/m$^2$). Kg is a coefficient including $S^{-1}(\lambda g)\times T^{-1}(\lambda g)$, and a conversion coefficient for converting a calculation result into an irradiance (W/m$^2$). Kb is a coefficient including $S^{-1}(\lambda b)\times T^{-1}(\lambda b)$, and a conversion coefficient for converting a calculation result into an irradiance (W/m$^2$). R, G, and B indicate the illuminances of the environment light in wavelength bands of red, green, and blue, detected by the illuminance sensor 42.

In Step S132, as with the processing of Step S32 of FIG. 8, the irradiance of the environment light in the near-infrared light region is detected.

In Step S133, the color temperature estimation unit 411 estimates the color temperature of the environment light.

For example, the color temperature estimation unit 411 reads out the input table from the storage unit 108.

Figure 22:
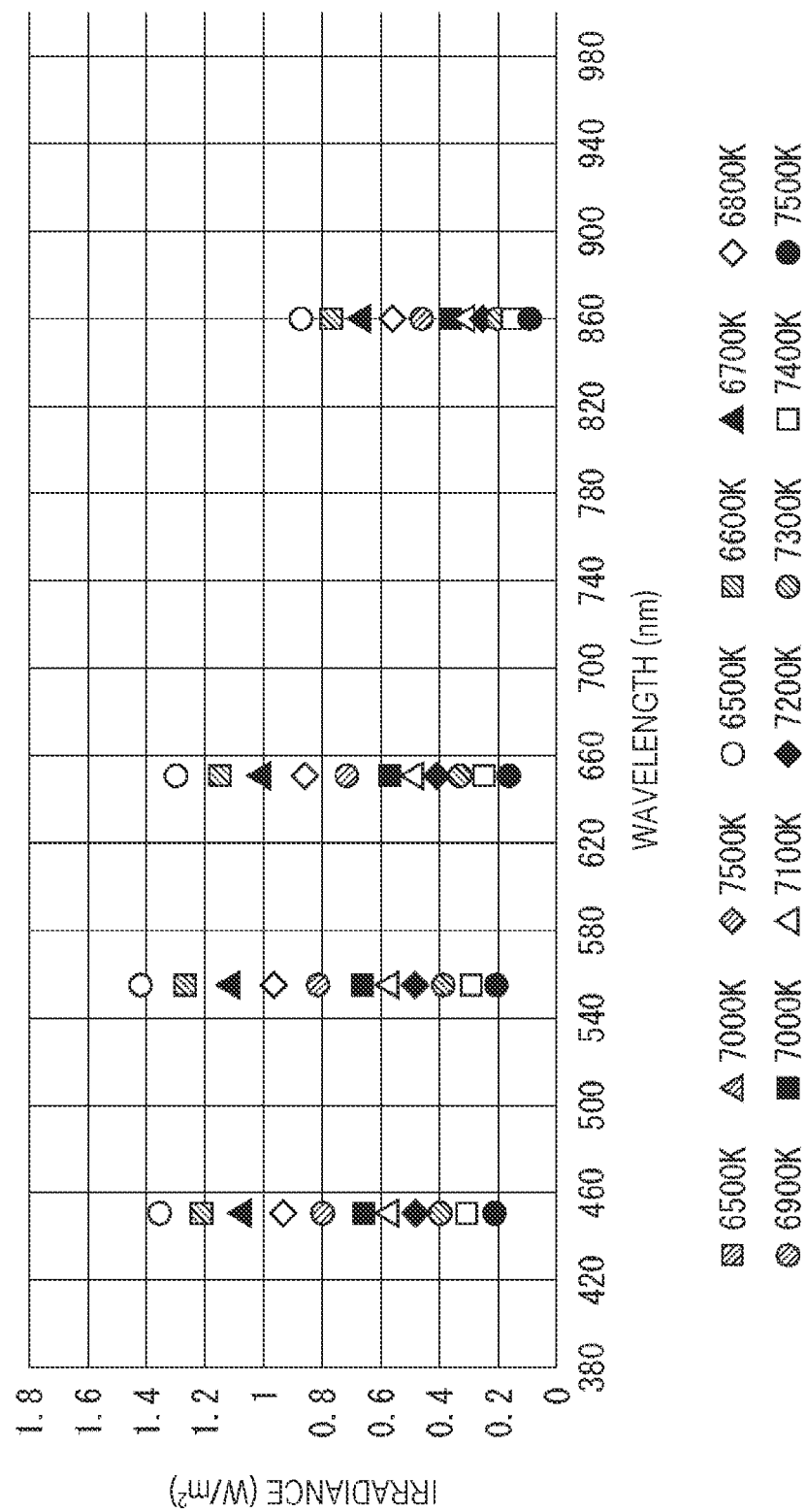
FIG. 22 is a diagram in which a second embodiment of the input table is illustrated as a graph.

FIG. 22 illustrates an example in which the input table read out from the storage unit 108, is illustrated as a graph. The input table of FIG. 22 includes less data of the visible light region, and includes only irradiances with respect to wavelengths of red, green, and blue, compared to the input table of FIG. 11, described above.

Accordingly, in the input table of FIG. 22, it is possible to reduce a data amount, compared to the input table of FIG. 11.

The color temperature estimation unit 411 calculates each degree of similarity between a data set of the calculated irradiance L(λr), irradiance L(λg), irradiance L(λb), and irradiance L(λnir), and a data set of the irradiances of the environment light of each of the color temperature in the input table. In the degree of similarity, for example, a difference absolute value sum is used. Then, the color temperature estimation unit 411 estimates that a color temperature having the highest degree of similarity, is the current color temperature of the environment light. At this time, in the input table of FIG. 22, the data amount is smaller than that in the input table of FIG. 11, and thus, it is possible to reduce a calculation amount.

After that, the color temperature estimation processing is ended.

Returning to FIG. 19, in Step S103, the coefficient calculation unit 412 obtains the spectral coefficient.

For example, the coefficient calculation unit 412 reads out the output table in which spectral coefficients α with respect to each of the color temperatures are registered, from the storage unit 108.

Here, the spectral coefficient α is represented by Equation (23) described below.

$$\alpha = C(\lambda r) \times L(\lambda r) / \{C(\lambda nir) \times L(\lambda nir)\} \quad (23)$$

The spectral coefficient α represents a ratio between a product of the spectral characteristics C(λr) of the camera 331 and the spectral characteristics L(λr) of the environment light at the wavelength λr, and a product of the spectral characteristics C(λnir) of the camera 331 and the spectral characteristics L(λnir) of the environment light at the wavelength λnir.

Figure 23:
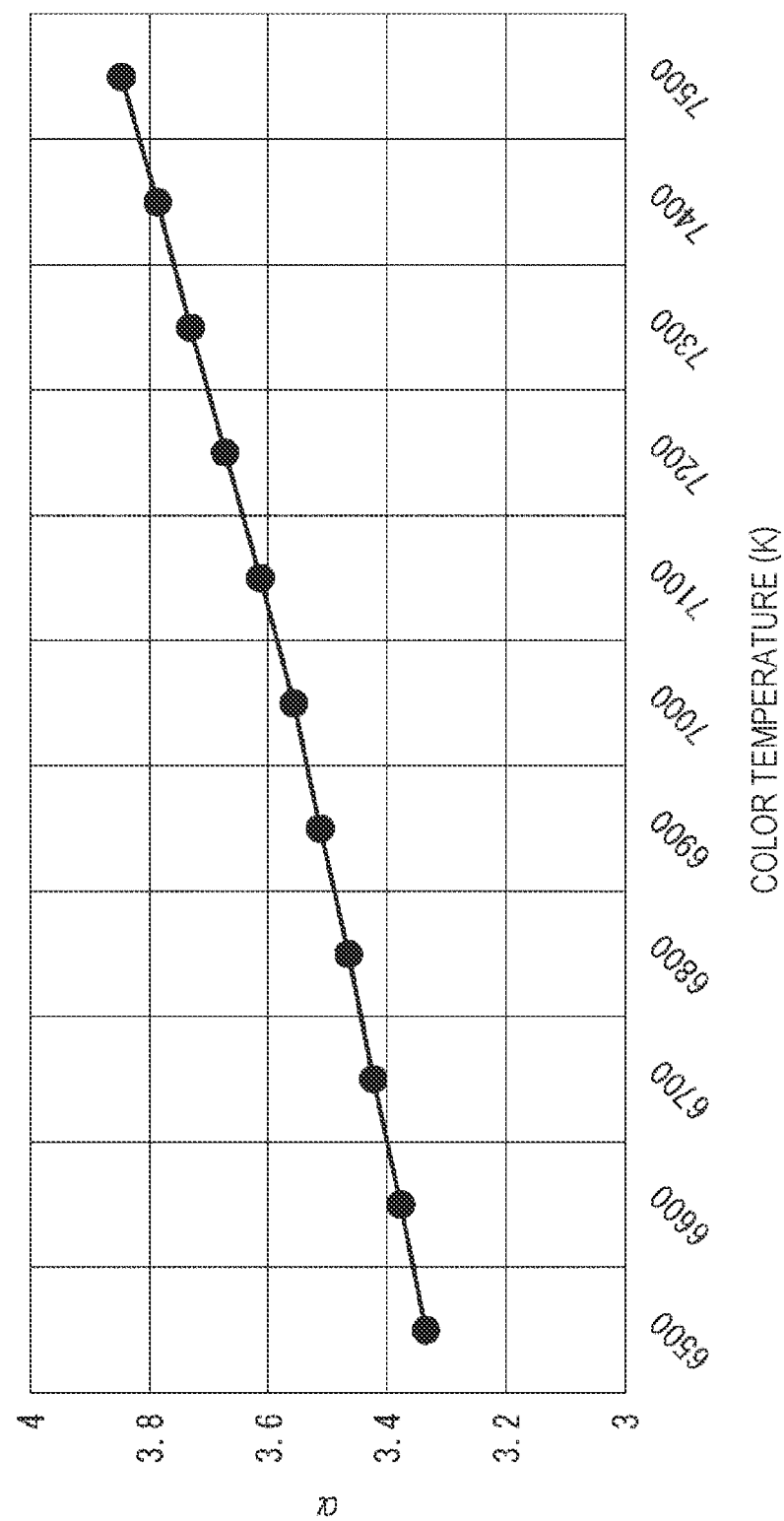
FIG. 23 is a diagram in which a second embodiment of the output table is illustrated as a graph.

FIG. 23 illustrates an example in which the output table is illustrated as a graph. In FIG. 23, a horizontal axis represents the color temperature (unit is K), and a vertical axis represents the spectral coefficient α.

The coefficient calculation unit 412 obtains the spectral coefficient α corresponding to the color temperature that is estimated by the color temperature estimation unit 411, in the output table.

In Step S104, the evaluation index calculation unit 413 calculates the evaluation index.

For example, the evaluation index calculation unit 163 calculates a normalized difference vegetation index (NDVI) defined by Equation (24) described below, as the evaluation index.

[Math. 2]

$$NDVI = \frac{P(\lambda nir) - P(\lambda r)}{P(\lambda nir) + P(\lambda r)} = \frac{1 - P(\lambda r)/P(\lambda nir)}{1 + P(\lambda r)/P(\lambda nir)} \quad (24)$$

Here, P(λr)/P(λnir) in Equation (24), is represented by Equation (25) described below, on the basis of Equation (18) and Equation (23) described above.

[Math. 3]

$$P(\lambda r)/P(\lambda nir) = \frac{(CO(\lambda r)/(C(\lambda r) \times L(\lambda r)))}{(CO(\lambda nir)/(C(\lambda nir) \times L(\lambda nir)))} \quad (25)$$
$$= \frac{CO(\lambda r)}{CO(\lambda nir) \times \alpha}$$

Then, P(λr)/P(λnir) in Equation (25) is assigned to Equation (24), and thus, Equation (26) is obtained.

[Math. 4]

$$NDVI = \frac{CO(\lambda nir) \times \alpha - CO(\lambda r)}{CO(\lambda nir) \times \alpha + CO(\lambda r)} \quad (26)$$

Therefore, the evaluation index calculation unit 163 performs the following calculation with respect to each of the pixels of the synthetic sensing image.

Specifically, the evaluation index calculation unit 163 calculates the luminance CO(λr) at the wavelength λr and the luminance CO(λnir) at the wavelength λnir, in each of the pixels. Then, the evaluation index calculation unit 163 assigns the luminance CO(λr), the luminance CO(λnir), and the spectral coefficient α to Equation (26), and thus, calculates the NDVI.

After that, the evaluation index calculation processing is ended.

Thus, in the second embodiment, it is possible to more simply obtain the evaluation index, without obtaining the spectral characteristics of the environment light and the spectral characteristics of the reflection rate of the subject.

<<3. Modification Example>>

Hereinafter, a modification example of the embodiments of the present technology described above, will be described.

<Modification Example Relevant to System Configuration>

The configuration example of the information processing system 11 and the information processing system 301, described above is an example, and as necessary, can be changed. For example, it is possible to change the share of the functions of each unit of the information processing system 11 and the information processing system 301. For example, the remote sensing HW 21 may have all or a part of the functions of the information processing unit 151 of FIG. 5. For example, the remote sensing HW 321 may have all or a part of the functions of the information processing unit 401 of FIG. 18.

In addition, for example, all or a part of the functions of the information processing unit 151 or the information processing unit 401 may be performed by a server or the like.

Figure 24:
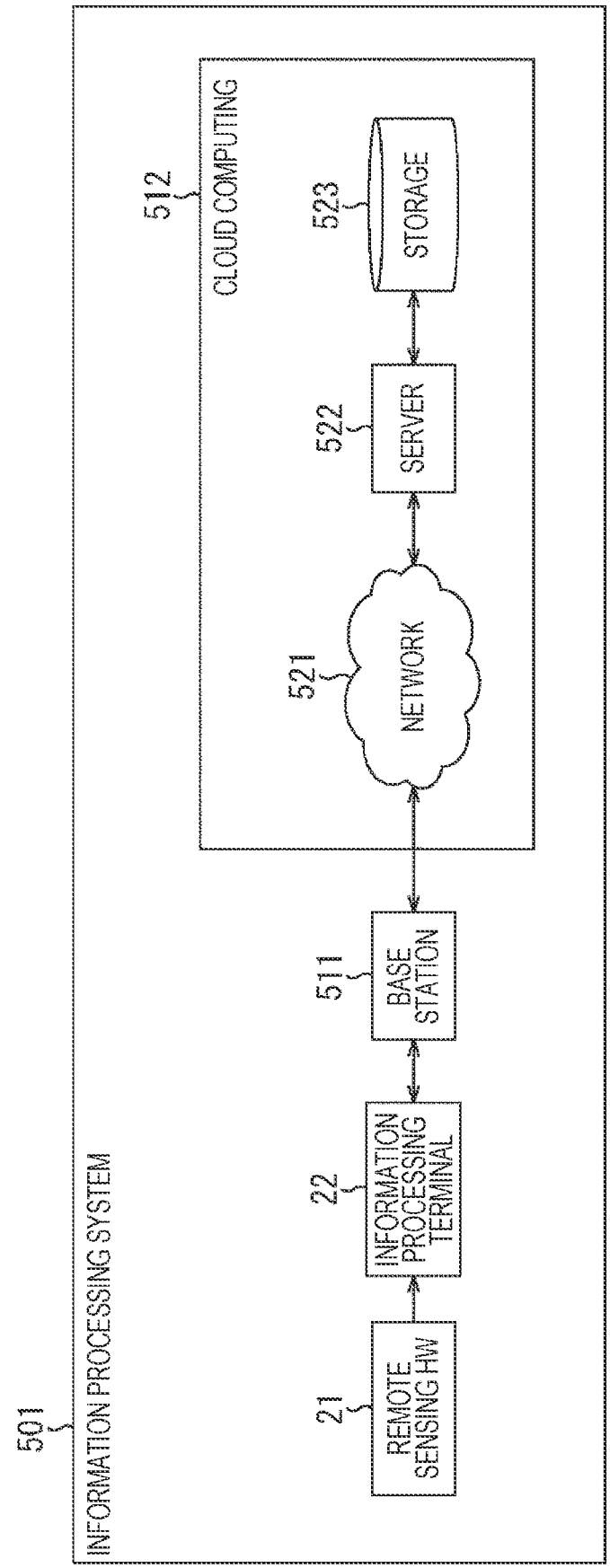
FIG. 24 is a block diagram illustrating a third embodiment of the information processing system to which the present technology is applied.

FIG. 24 illustrates a configuration example of an information processing system 501 in which all or a part of the functions of the information processing unit 151 are performed by a server 522.

The information processing system 501 includes a base station 511 and a cloud computing (hereinafter, simply referred to as a cloud) 512, in addition to the remote sensing HW 21 and the information processing terminal 22.

The cloud 512 includes a network 521, a server 522, and a storage 523.

The base station 511 connects the information processing terminal 22 to the network 521, and performs data relay between the information processing terminal 22 and the network 521, or the like.

The network 521, for example, is a communication network including the internet or the like. Furthermore, the network 521 may include a plurality of communication networks.

The server 522 realizes all or a part of the functions of the information processing unit 151.

For example, the information processing terminal 22 transmits the sensing data that is acquired by the remote sensing HW 21, to the server 522 through the base station 511 and the network 521.

The server 522 stores the received sensing data in the storage 523. In the storage 523, the input table and the output table, described above, are also stored. Then, the server 522 performs the processing described above, and calculates the evaluation index, on the basis of the sensing data, the input table, and the output table.

Similarly, the server 522 is also capable of realizing all or a part of the functions of the information processing unit 401.

In addition, for example, the processing of the information processing terminal 22 may be executed at a higher speed, by using a field-programmable gate array (FPGA) or the like.

Further, the camera 331 of FIG. 17 has a configuration in which two photographing units of the photographing unit 352a and the photographing unit 352b are provided, but one photographing unit may be provided. For example, a dual bandpass filter transmitting a red wavelength band and a predetermined wavelength band of near-infrared light, may be provided in the photographing unit, and thus, a sensing image including the red component and the near-infrared light component of the subject, may be photographed.

In addition, for example, control unit 43 of the sensor box 31 and the control unit 55 of the camera 32, in the remote sensing HW 21, may be commonalized. Similarly, for example, the control unit 43 of the sensor box 31 and the control unit 355 of the camera 331, in the remote sensing HW 321, may be commonalized.

Further, for example, the illuminance sensor 42 is capable of directly detecting the illuminance of the environment light not through the diffusion plate 41. In this case, for example, in Equation (3) described above, the spectral characteristics (the irradiance) $L(\lambda)$ of the environment light are calculated without using the spectral characteristics $T(\lambda)$ of the diffusion plate 41.

<Modification Example Relevant to Evaluation Index>

The evaluation index that can be applied to the present technology, is not limited to the examples described above, but other evaluation indices can be used.

In addition, the number of wavelengths to be used for calculating the evaluation index, is not limited to two wavelengths, and can be one wavelength, or three or more wavelengths.

Further, in the second embodiment of the present technology, it is also possible to calculate the evaluation index other than the NDVI, by changing the wavelength band to be photographed.

<Other Modification Examples>

In the above description, an example of estimating the color temperature by using even the spectral characteristics in the near-infrared light region, has been described, but for example, the color temperature may be estimated by using only the spectral characteristics in the visible light region, without using the spectral characteristics in the near-infrared light region.

In addition, an estimation result of the color temperature can also be used for an object other than the objects described above.

<<4. Others>>

<Providing Method of Program and Others>

A set of pieces of processing described above can be executed by hardware, and can be executed by software. In a case where the set of pieces of processing are executed by the software, a program configuring the software, is installed in a computer (for example, the CPU 101 of the information processing terminal 22). Here, the computer, for example, includes a computer incorporated in dedicated hardware, a general-purpose personal computer capable of executing various functions by installing various programs, or the like.

For example, in the information processing terminal 22, the CPU 101, for example, executes a program recorded in the storage unit 108 through the input and output interface 105 and the bus 104, by loading the program in the RAM 103, and thus, the set of pieces of processing are performed.

Furthermore, the program executed by the information processing terminal 22 (the CPU 101), for example, can be provided by being recorded in the removable medium 23 as a package medium or the like. In addition, the program can be provided through a wired or wireless transmission medium such as a local area network, the internet, and digital satellite broadcasting.

In the information processing terminal 22, the program can be installed in the storage unit 108 through the input and output interface 105, by mounting the removable medium 23 on the drive 110. In addition, the program can be received by the communication unit 109 through the wired or wireless transmission medium, and can be installed in the storage unit 108. In addition, the program can be installed in advanced in the ROM 102 or the storage unit 108.

Furthermore, the program executed by the computer, may be a program in which processing is performed in chronological order along the sequence described herein, or may be a program in which processing is performed in parallel or at a necessary timing such as when calling is performed.

In addition, herein, the system indicates an assembly of a plurality of constituents (devices, modules (components), or the like), but all of the constituents may not be in the same housing. Therefore, both of a plurality of devices that are contained in separate housings and are connected to each other through a network, and one device in which a plurality of modules are contained in in one housing, are the system.

Further, the embodiments of the present technology are not limited to the embodiments described above, and various changes can be performed within a range not departing from the gist of the present technology.

For example, the present technology can be configured as a cloud computing in which one function is shared in a plurality of devices through a network, and is processed in cooperation.

In addition, each of the steps described in the flowchart described above, can be executed by being shared in a plurality of devices, in addition to executing each of the steps by one device.

Further, in a case where a plurality of pieces of processing are included in one step, the plurality of pieces of processing included in the one step can be executed by being shared in a plurality of devices, in addition to executing the plurality of pieces of processing by one device.

<Combination Example of Configurations>

The present technology can be configured as follows.

(1)

An information processing device, including: a color temperature estimation unit configured to estimate a color temperature of environment light, on the basis of detected values of illuminances of the environment light at a plurality of wavelength bands, detected by an illuminance sensor.

(2)

The information processing device according to (1), in which the color temperature estimation unit calculates irradiances of the environment light at a plurality of wavelengths, on the basis of the detected values of the illuminances of the environment light at the plurality of wavelength bands, and estimates the color temperature of the environment light, on the basis of calculated values of the irradiances of the environment light at the plurality of wavelengths.

(3)

The information processing device according to (2), in which the color temperature estimation unit estimates the color temperature of the environment light, by comparing the calculated values of the irradiances of the environment light at the plurality of wavelengths, with defined values of the irradiances of the environment light of each color temperature at the plurality of wavelengths.

(4)

The information processing device according to (2) or (3), in which the plurality of wavelength bands in the environment light include a wavelength band in a visible light region and a wavelength band in a near-infrared light region, and
the plurality of wavelengths of the environment light include a wavelength in the visible light region and a wavelength in the near-infrared light region.

(5)

The information processing device according to any one of (2) to (4),
in which the color temperature estimation unit calculates the irradiances of the environment light at the plurality of wavelengths, on the basis of the detected values of the illuminances of the environment light at the plurality of wavelength bands, and spectral characteristics of the illuminance sensor.

(6)

The information processing device according to (5), in which the illuminance sensor detects the illuminance of the environment light through a diffusion plate, and the color temperature estimation unit calculates the irradiances of the environment light at the plurality of wavelengths, on the further basis of spectral characteristics of the diffusion plate.

(7)

The information processing device according to any one of (1) to (6), further including: a spectroscopic analysis unit configured to analyze spectral characteristics of a reflection rate of a subject that is photographed under the environment light, on the basis of spectral characteristics of the environment light of the estimated color temperature.

(8)

The information processing device according to (7), in which the spectroscopic analysis unit analyzes the spectral characteristics of the reflection rate of the subject, on the further basis of spectral characteristics of a photographing device that photographs the subject.

(9)

The information processing device according to (7) or (8), further including:
an evaluation index calculation unit configured to calculate an evaluation index that is used for evaluating the subject, on the basis of the reflection rate of the subject with respect to light of the plurality of wavelengths.

(10)

The information processing device according to (9), in which the evaluation index is a normalized difference spectral index (NDSI).

(11)

The information processing device according to any one of (1) to (8), further including:
a coefficient calculation unit configured to calculate a coefficient indicating a ratio between a product of spectral characteristics of a photographing device with respect to a first wavelength and spectral characteristics of the environment light, and a product of spectral characteristics of the photographing device with respect to a second wavelength and the spectral characteristics of the environment light; and
an evaluation index calculation unit configured to calculate an evaluation index that is used for evaluating a subject in an image photographed by the photographing device, on the basis of a component of the first wavelength and a component of the second wavelength of the image, and the coefficient.

(12)

The information processing device according to (11), in which the first wavelength is a wavelength of red light,
the second wavelength is a wavelength of near-infrared light, and
the evaluation index is a normalized difference vegetation index (NDVI).

(13)

An information processing method, including: allowing an information processing device to estimate a color temperature of environment light, on the basis of detected values of illuminances of the environment light at a plurality of wavelength bands, detected by an illuminance sensor.

(14)

A program for allowing a computer to execute processing of:
estimating a color temperature of environment light, on the basis of detected values of illuminances of the environment light at a plurality of wavelength bands, detected by an illuminance sensor.

(1A) An information processing device, comprising:
a memory configured to store detected values of illuminances of environment light; and
a color temperature estimation unit configured to estimate a color temperature of the environment light, on a basis of detected values of illuminances of the environment light within a plurality of wavelength bands.

(2A) The information processing device according to (1A),
wherein the plurality of wavelength bands of the environment light include a wavelength band in a visible light region and a wavelength band in a near-infrared light region.

(3A) The information processing device according to (2A),
wherein the color temperature estimation unit calculates irradiances of the environment light at a plurality of wavelengths, on a basis of the detected values of the illuminances of the environment light at the plurality of wavelength bands, and estimates the color temperature of the environment light, on a basis of calculated values of the irradiances of the environment light at the plurality of wavelengths.

(4A) The information processing device according to (3A), wherein the color temperature estimation unit estimates the color temperature of the environment light, by comparing the calculated values of the irradiances of the environment light at the plurality of wavelengths, with defined values of the irradiances of the environment light of each color temperature at the plurality of wavelengths.

(5A) The information processing device according to (3A), wherein the plurality of wavelengths of the environment light include a wavelength in the visible light region and a wavelength in the near-infrared light region.

(6A) The information processing device according to (3A), wherein the detected values of the illuminances of the environment light within the plurality of wavelength bands are detected by an illuminance sensor.

(7A) The information processing device according to (6A), wherein the color temperature estimation unit calculates the irradiances of the environment light at the plurality of wavelengths, on a basis of the detected values of the illuminances of the environment light at the plurality of wavelength bands, and spectral characteristics of the illuminance sensor.

(8A) The information processing device according to (7A), wherein the illuminance sensor detects the illuminance of the environment light through a diffusion plate, and the color temperature estimation unit calculates the irradiances of the environment light at the plurality of wavelengths, on a further basis of spectral characteristics of the diffusion plate.

(9A) The information processing device according to (1A), further comprising:
a spectroscopic analysis unit configured to detect spectral characteristics of a reflection rate of a subject that is photographed under the environment light, on a basis of spectral characteristics of the environment light of the estimated color temperature.

(10A) The information processing device according to (9A), wherein the spectroscopic analysis unit detects the spectral characteristics of the reflection rate of the subject, on a further basis of spectral characteristics of a photographing device that photographs the subject.

(11A) The information processing device according to (9A), further comprising:
an evaluation index calculation unit configured to calculate an evaluation index that is used for evaluating the subject, on a basis of the reflection rate of the subject.

(12A) The information processing device according to (11A), wherein the evaluation index is a normalized difference spectral index (NDSI).

(13A) The information processing device according to (1A), further comprising:
a coefficient calculation unit configured to calculate a coefficient indicating a ratio between a product of spectral characteristics of a photographing device with respect to a first wavelength and spectral characteristics of the environment light, and a product of spectral characteristics of the photographing device with respect to a second wavelength and the spectral characteristics of the environment light; and
an evaluation index calculation unit configured to calculate an evaluation index that is used for evaluating a subject in an image photographed by the photographing device, on a basis of a component of the first wavelength and a component of the second wavelength of the image, and the coefficient.

(14A) The information processing device according to (13A), wherein the first wavelength is a wavelength of red light, the second wavelength is a wavelength of near-infrared light, and the evaluation index is a normalized difference vegetation index (NDVI).

(15A) The information processing device according to (2A), wherein the wavelength band in the visible light region is one of a red light region, a blue light region or a green light region.

(16A) The information processing device according to (2A), wherein the plurality of wavelength bands of the environment light include a plurality of wavelength bands in visible light regions, the visible light regions respectively being two or more of a red light region, a blue light region or a green light region.

(17A) An information processing method, comprising:
storing detected values of illuminances of environment light; and
estimating a color temperature of the environment light, on a basis of the detected values of illuminances of the environment light within a plurality of wavelength bands.

(18A) A non-transitory computer readable medium storing program code executable by a processor to perform operations comprising:
storing detected values of illuminances of environment light; and
estimating a color temperature of the environment light, on a basis of the detected values of illuminances of the environment light within a plurality of wavelength bands.

(19A) An apparatus comprising:
a processor; and
a memory, the memory storing program code executable by the processor to perform operations comprising:
storing detected values of illuminances of environment light; and
estimating a color temperature of the environment light, on a basis of the detected values of illuminances of the environment light within a plurality of wavelength bands.

Furthermore, the effects described herein are merely an example, are not limited, and may include other effects.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

11 Information processing system
21 Remote sensing HW
22 Information processing terminal
23 Removable medium
31 Sensor box
32 Camera
41 Diffusion plate
42 Illuminance sensor
43 Control unit
52 Photographing unit
53 Signal processing unit
55 Control unit
71 Filter
72 Image sensor
81 Drone
101 CPU
151 Information processing unit
161 Color temperature estimation unit
162 Spectroscopic analysis unit
163 Evaluation index calculation unit
301 Information processing system
321 Remote sensing HW 331 Camera
352a, 352b Photographing unit
353 Signal processing unit
355 Control unit
401 Information processing unit
411 Color temperature estimation unit
412 Coefficient calculation unit
413 Evaluation index calculation unit
501 Information processing system
512 Cloud computing
522 Server

The invention claimed is:

1. An information processing device, comprising:
a memory configured to store detected values of illuminances of environment light; and
color temperature estimation circuitry configured to estimate a color temperature of the environment light, on a basis of detected values of illuminances of the environment light within a plurality of wavelength bands, wherein
the plurality of wavelength bands of the environment light includes a wavelength band in a visible light region and a wavelength band in a near-infrared light region, and
the color temperature estimation circuitry calculates irradiances of the environment light at a plurality of wavelengths, on a basis of the detected values of the illuminances of the environment light at the plurality of wavelength bands, and estimates the color temperature of the environment light, on a basis of calculated values of the irradiances of the environment light at the plurality of wavelengths.

2. The information processing device according to claim 1,
wherein the color temperature estimation circuitry estimates the color temperature of the environment light, by comparing the calculated values of the irradiances of the environment light at the plurality of wavelengths, with defined values of the irradiances of the environment light of each color temperature at the plurality of wavelengths.

3. The information processing device according to claim 1,
wherein the plurality of wavelengths of the environment light include a wavelength in the visible light region and a wavelength in the near-infrared light region.

4. The information processing device according to claim 1,
wherein the detected values of the illuminances of the environment light within the plurality of wavelength bands are detected by an illuminance sensor.

5. The information processing device according to claim 4,
wherein the color temperature estimation circuitry calculates the irradiances of the environment light at the plurality of wavelengths, on a basis of the detected values of the illuminances of the environment light at the plurality of wavelength bands, and spectral characteristics of the illuminance sensor.

6. The information processing device according to claim 5,
wherein the illuminance sensor detects the illuminance of the environment light through a diffusion plate, and
the color temperature estimation circuitry calculates the irradiances of the environment light at the plurality of wavelengths, on a further basis of spectral characteristics of the diffusion plate.

7. The information processing device according to claim 1, further comprising:
spectroscopic analysis circuitry configured to detect spectral characteristics of a reflection rate of a subject that is photographed under the environment light, on a basis of spectral characteristics of the environment light of the estimated color temperature.

8. The information processing device according to claim 7,
wherein the spectroscopic analysis circuitry detects the spectral characteristics of the reflection rate of the subject, on a further basis of spectral characteristics of a photographing device that photographs the subject.

9. The information processing device according to claim 7, further comprising:
evaluation index calculation circuitry configured to calculate an evaluation index that is used for evaluating the subject, on a basis of the reflection rate of the subject.

10. The information processing device according to claim 9,
wherein the evaluation index is a normalized difference spectral index (NDSI).

11. The information processing device according to claim 1, further comprising:
coefficient calculation circuitry configured to calculate a coefficient indicating a ratio between a product of spectral characteristics of a photographing device with respect to a first wavelength and spectral characteristics of the environment light, and a product of spectral characteristics of the photographing device with respect to a second wavelength and the spectral characteristics of the environment light; and
evaluation index calculation circuitry configured to calculate an evaluation index that is used for evaluating a subject in an image photographed by the photographing device, on a basis of a component of the first wavelength and a component of the second wavelength of the image, and the coefficient.

12. The information processing device according to claim 11,
wherein the first wavelength is a wavelength of red light, the second wavelength is a wavelength of near-infrared light, and
the evaluation index is a normalized difference vegetation index (NDVI).

13. The information processing device according to claim 1,
wherein the wavelength band in the visible light region is one of a red light region, a blue light region or a green light region.

14. The information processing device according to claim 1,
wherein the plurality of wavelength bands of the environment light include a plurality of wavelength bands in visible light regions, the visible light regions respectively being two or more of a red light region, a blue light region or a green light region.

15. An information processing method, comprising:
storing detected values of illuminances of environment light; and
estimating a color temperature of the environment light, on a basis of the detected values of illuminances of the environment light within a plurality of wavelength bands, wherein the plurality of wavelength bands of the environment light includes a wavelength band in a visible light region and a wavelength band in a near-infrared light region, and calculating irradiances of the environment light at a plurality of wavelengths, on a basis of the detected values of the illuminances of the environment light at the plurality of wavelength bands, and estimating the color temperature of the environment light, on a basis of calculated values of the irradiances of the environment light at the plurality of wavelengths.

16. A non-transitory computer readable medium storing program code executable by a processor to perform operations comprising:

storing detected values of illuminances of environment light; and estimating a color temperature of the environment light, on a basis of the detected values of illuminances of the environment light within a plurality of wavelength bands, wherein the plurality of wavelength bands of the environment light includes a wavelength band in a visible light region and a wavelength band in a near-infrared light region, and calculating irradiances of the environment light at a plurality of wavelengths, on a basis of the detected values of the illuminances of the environment light at the plurality of wavelength bands, and estimating the color temperature of the environment light, on a basis of calculated values of the irradiances of the environment light at the plurality of wavelengths.

17. An apparatus comprising:

a processor; and a memory, the memory storing program code executable by the processor to perform operations comprising:

storing detected values of illuminances of environment light; and estimating a color temperature of the environment light, on a basis of the detected values of illuminances of the environment light within a plurality of wavelength bands, wherein the plurality of wavelength bands of the environment light includes a wavelength band in a visible light region and a wavelength band in a near-infrared light region, and calculating irradiances of the environment light at a plurality of wavelengths, on a basis of the detected values of the illuminances of the environment light at the plurality of wavelength bands, and estimating the color temperature of the environment light, on a basis of calculated values of the irradiances of the environment light at the plurality of wavelengths.

* * * * *